(12) United States Patent
Elshafie et al.

(10) Patent No.: US 11,539,566 B2
(45) Date of Patent: Dec. 27, 2022

(54) GENERALIZATION OF ENCODING FOR UPLINK TRANSMISSIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/187,522

(22) Filed: Feb. 26, 2021

(65) Prior Publication Data

US 2022/0286341 A1  Sep. 8, 2022

(51) Int. Cl.
*H04L 25/02* (2006.01)
*H04L 27/26* (2006.01)
*H04W 72/04* (2009.01)
*H04L 5/00* (2006.01)

(52) U.S. Cl.
CPC ........ *H04L 27/2628* (2013.01); *H04L 5/0048* (2013.01); *H04W 72/0413* (2013.01)

(58) Field of Classification Search
CPC ............... H04L 25/022; H04L 27/2602; H04L 27/2646; H04L 5/0007; H04L 5/0048; H04L 5/0053; H04L 27/2628; H04L 27/2662; G06F 17/141; G06F 17/142
See application file for complete search history.

(56) References Cited

U.S. PATENT DOCUMENTS

| | | | |
|---|---|---|---|
| 2004/0220986 A1* | 11/2004 | Pisoni | H04L 27/2628 708/403 |
| 2015/0189298 A1* | 7/2015 | Ye | H04N 19/117 375/240.16 |
| 2020/0092030 A1* | 3/2020 | Ju | H04L 25/022 |
| 2021/0215747 A1* | 7/2021 | Sud | G01R 23/165 |

\* cited by examiner

*Primary Examiner* — Mansour Oveissi
(74) *Attorney, Agent, or Firm* — Holland & Hart LLP

(57) ABSTRACT

Methods, systems, and devices for wireless communications are described. Generally, a user equipment (UE) may identify an angle parameter for encoding uplink messages using a fractional Fourier Transform (FrFFT). A base station may transmit a set of angle parameters or a single angle parameter that the UE is to use for encoding an uplink message. The UE may select an alpha value from the set of alpha values for the encoding. The UE may transmit an indication of a set of proposed angle parameters to the base station, and the base station may determine and indicate one of or a subset of the received set of proposed angle parameters to the UE. The base station may indicate a correspondence between angle parameters and beam configurations, and the UE may identify an alpha parameter value based on a subsequently indicated beam configuration.

30 Claims, 20 Drawing Sheets

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

Column $n$ ↓ ; Row $n$ →

— 401

$$\begin{bmatrix} S(M-1)\, e^{j2\pi(M-1)m/M} \\ \vdots \\ S(i)\, e^{j2\pi i m/M} \\ \vdots \\ S(2)\, e^{j2\pi 2 m/M} \\ S(1)\, e^{j2\pi 1 m/M} \\ S(0)\, e^{j2\pi 0 m/M} \end{bmatrix}$$

Tone Index ↑ ← Tone Index $l$

GENERALIZATION OF ENCODING FOR UPLINK TRANSMISSIONS

FIELD OF TECHNOLOGY

The present disclosure relates to wireless communications, including generalization of encoding for uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, UEs may encode uplink messages using one or more encoding techniques.

SUMMARY

The described techniques relate to improved methods, systems, devices, and apparatuses that support generalization of encoding for uplink transmissions. Generally, a user equipment (UE) may generalize demodulation reference signal (DMRS)-less sequence-based encoding techniques by using a fractional Fourier transform (FrFFT) to encode data. FrFFT encoding may result in more flexibility than less flexible DFT encoding techniques. The UE may identify an angle parameter (e.g. alpha value for encoding uplink messages using the FrFFT) that rotates a Fourier transform by an angle alpha. In some examples, a base station may transmit, and the UE may receive, a set of angle parameters or a single angle parameter that the UE is to use for encoding an uplink message. In such examples, the UE may select an alpha value from the set of alpha values for encoding using the FrFFT. In some other examples, the UE may transmit an indication of a set of proposed angle parameters to the base station, and the base station may determine and indicate one of or a subset of the received set of proposed angle parameters to the UE. In some examples, the base station may indicate a correspondence between angle parameters and beam configurations (e.g., quasi co-location (QCL) configurations, or TCI states), and the UE may identify an alpha parameter value based on a subsequently indicated beam configuration (e.g., QCL configuration or TCI state). In some examples, the UE and the base station may communicate with each other, down selecting smaller and smaller subsets of an initial set of angle parameters.

A method for wireless communications at a UE is described. The method may include receiving, from a base station, an indication of a first set of angle parameters for the UE to use for an inverse fractional Fourier transform, encoding an uplink message using the inverse fractional Fourier transform according to an angle parameter of the first set of angle parameters, and transmitting, to the base station on an uplink channel, the uplink message that is encoded using the fractional Fourier transform according to the indicated angle parameter.

An apparatus for wireless communications at a UE is described. The apparatus may include a processor, memory coupled with the processor, and instructions stored in the memory. The instructions may be executable by the processor to cause the apparatus to receive, from a base station, an indication of a first set of angle parameters for the UE to use for an inverse fractional Fourier transform, encode an uplink message using the inverse fractional Fourier transform according to an angle parameter of the first set of angle parameters, and transmit, to the base station on an uplink channel, the uplink message that is encoded using the fractional Fourier transform according to the indicated angle parameter.

Another apparatus for wireless communications at a UE is described. The apparatus may include means for receiving, from a base station, an indication of a first set of angle parameters for the UE to use for an inverse fractional Fourier transform, means for encoding an uplink message using the inverse fractional Fourier transform according to an angle parameter of the first set of angle parameters, and means for transmitting, to the base station on an uplink channel, the uplink message that is encoded using the fractional Fourier transform according to the indicated angle parameter.

A non-transitory computer-readable medium storing code for wireless communications at a UE is described. The code may include instructions executable by a processor to receive, from a base station, an indication of a first set of angle parameters for the UE to use for an inverse fractional Fourier transform, encode an uplink message using the inverse fractional Fourier transform according to an angle parameter of the first set of angle parameters, and transmit, to the base station on an uplink channel, the uplink message that is encoded using the fractional Fourier transform according to the indicated angle parameter.

Some examples of the method, apparatuses, and non-transitory computer-readable medium described herein may further include operations, features, means, or instructions for receiving, from the base station, an indication of the angle parameter of the first set of angle parameters for the UE to use for the inverse fractional Fourier transform.

In some examples of the method, apparatuses, and non-transitory computer-readable medium described herein, selecting, by the UE, a second set of angle parameters including the angle parameter and transmitting, to the base station, an indication of the selected second set of angle parameters, where receiving the indication of the first set of angle parameters may be responsive at least in part to the first set of angle parameters.

Some examples of the method, apparatuses, and non-transitory computer-readable medium described herein may further include operations, features, means, or instructions for transmitting, to the base station, an indication of a second set of angle parameters including the angle parameter, where the indication of the first set of angle parameters may be received at least in part in response to the transmitted indication of the second set of angle parameters, selecting, from the first set of angle parameters, a set of multiple angle parameters including the angle parameter, transmitting, to the base station, an indication of the selection, and receiving an indication of the angle parameter at least in part in response to the transmitted indication of the selection.

In some examples of the method, apparatuses, and non-transitory computer-readable medium described herein, receiving the indication of the first set of angle parameters may include operations, features, means, or instructions for receiving a configuration indicating a correspondence between a set of beam configurations and the first set of angle parameters.

Some examples of the method, apparatuses, and non-transitory computer-readable medium described herein may further include operations, features, means, or instructions for receiving, from the base station, an indication of a beam configuration associated with the uplink message and selecting the angle parameter from the first set of angle parameters based on receiving the indication of the beam configuration and the correspondence, where encoding the uplink message may be based on the selecting.

In some examples of the method, apparatuses, and non-transitory computer-readable medium described herein, receiving the indication of the first set of angle parameters may include operations, features, means, or instructions for receiving a configuration indicating a correspondence between a set of quasi co-location configurations and the first set of angle parameters.

Some examples of the method, apparatuses, and non-transitory computer-readable medium described herein may further include operations, features, means, or instructions for receiving, from the base station, an indication of a quasi co-location configuration associated with the uplink channel and selecting the angle parameter from the first set of angle parameters based on receiving the indication of the quasi co-location configuration and the correspondence, where encoding the uplink message may be based on the selecting.

In some examples of the method, apparatuses, and non-transitory computer-readable medium described herein, receiving the indication of the first set of angle parameters may include operations, features, means, or instructions for receiving a configuration indicating a correspondence between a set of channel conditions and the first set of angle parameters.

Some examples of the method, apparatuses, and non-transitory computer-readable medium described herein may further include operations, features, means, or instructions for determining channel state conditions at the UE and selecting the angle parameter from the first set of angle parameters based on determining the channel state conditions and the correspondence, where encoding the uplink message may be based on the selecting.

Some examples of the method, apparatuses, and non-transitory computer-readable medium described herein may further include operations, features, means, or instructions for transmitting, to the base station, an indication of a Doppler estimate, where the indication of the first set of angle parameters may be received at least in part in response to the transmitted indication of the Doppler estimate.

Some examples of the method, apparatuses, and non-transitory computer-readable medium described herein may further include operations, features, means, or instructions for receiving an index value corresponding to the angle parameter, where receiving the indication of the first set of angle parameters includes receiving a list of angle parameters, each angle parameter corresponding to one index of the list.

In some examples of the method, apparatuses, and non-transitory computer-readable medium described herein, receiving the indication of the first set of angle parameters may include operations, features, means, or instructions for receiving a radio resource control message, a media access control (MAC) control element (CE), a downlink control information message, or any combination thereof, including the indication of the first set of angle parameters.

In some examples of the method, apparatuses, and non-transitory computer-readable medium described herein, encoding the uplink message may include operations, features, means, or instructions for converting a set of information bits associated with the uplink message to a decimal value based on the angle parameter, selecting a sequence from a pool of sequences based on the decimal value and the angle parameter, and mapping the selected sequence to one or more resource elements on the uplink channel.

In some examples of the method, apparatuses, and non-transitory computer-readable medium described herein, the uplink message on the uplink channel includes an uplink control information message on an uplink control channel.

In some examples of the method, apparatuses, and non-transitory computer-readable medium described herein, the transmitted uplink message lacks an associated demodulation reference signal.

A method for wireless communications at a base station is described. The method may include transmitting, to a UE, an indication of a first set of angle parameters for the UE to use to encode uplink messages using an inverse fractional Fourier transform, receiving an uplink message from the UE on an uplink channel, and decoding the uplink message using a fractional Fourier transform according to an angle parameter of the first set of angle parameters.

An apparatus for wireless communications at a base station is described. The apparatus may include a processor, memory coupled with the processor, and instructions stored in the memory. The instructions may be executable by the processor to cause the apparatus to transmit, to a UE, an indication of a first set of angle parameters for the UE to use to encode uplink messages using an inverse fractional Fourier transform, receive an uplink message from the UE on an uplink channel, and decode the uplink message using a fractional Fourier transform according to an angle parameter of the first set of angle parameters.

Another apparatus for wireless communications at a base station is described. The apparatus may include means for transmitting, to a UE, an indication of a first set of angle parameters for the UE to use to encode uplink messages using an inverse fractional Fourier transform, means for receiving an uplink message from the UE on an uplink channel, and means for decoding the uplink message using a fractional Fourier transform according to an angle parameter of the first set of angle parameters.

A non-transitory computer-readable medium storing code for wireless communications at a base station is described. The code may include instructions executable by a processor to transmit, to a UE, an indication of a first set of angle parameters for the UE to use to encode uplink messages using an inverse fractional Fourier transform, receive an uplink message from the UE on an uplink channel, and decode the uplink message using a fractional Fourier transform according to an angle parameter of the first set of angle parameters.

Some examples of the method, apparatuses, and non-transitory computer-readable medium described herein may further include operations, features, means, or instructions for receiving, from the UE, an indication of a second set of angle parameters including the angle parameter and selecting the first set of angle parameters based on the first set of angle parameters from the UE.

In some examples of the method, apparatuses, and non-transitory computer-readable medium described herein, transmitting the indication of the first set of angle parameters may include operations, features, means, or instructions for transmitting a configuration indicating a correspondence between a set of beam configurations and the first set of angle parameters.

In some examples of the method, apparatuses, and non-transitory computer-readable medium described herein, transmitting the indication of the first set of angle parameters may include operations, features, means, or instructions for transmitting a configuration indicating a correspondence between a set of quasi co-location configurations and the first set of angle parameters.

In some examples of the method, apparatuses, and non-transitory computer-readable medium described herein, transmitting the indication of the first set of angle parameters may include operations, features, means, or instructions for transmitting a configuration indicating a correspondence between a set of channel conditions and individual ones of a set of angle parameters.

Some examples of the method, apparatuses, and non-transitory computer-readable medium described herein may further include operations, features, means, or instructions for receiving, from the UE, an indication of a Doppler estimate, where the indication of the first set of angle parameters may be transmitted based on receiving the indication of the Doppler estimate.

BRIEF DESCRIPTION OF THE DRAWINGS

FIG. 4 illustrates an example of an encoding scheme that supports generalization of encoding for uplink transmissions in accordance with aspects of the present disclosure.

DETAILED DESCRIPTION

Some wireless communications systems may support sequence-based demodulation reference signal (DMRS)-less non-coherent transmission of uplink signaling (e.g., uplink control information (UCI) on a physical uplink control channel (PUCCH)). In sequence-based DMRS-less non-coherent transmission, a user equipment (UE), may utilize a discrete Fourier transform (DFT) to encode the data and transmit it to a base station. However, utilizing DFT to encode data may limit flexibility and payload size (e.g., a number of bits that can be encoded in the transmission) in some circumstances (e.g., in cases of high speeds that result in high Doppler shifting).

In some cases, a UE may generalize a DFT encoding technique by using a fractional Fourier transform (FrFFT) to encode data. FrFFT encoding may result in more flexibility than less flexible DFT encoding techniques. In some examples, by using the more generalized and flexible encoding techniques, the UE may use more encoding bits, and may perform better in high Doppler cases. To perform the generalized encoding techniques, the UE may identify an angle parameter (e.g. alpha value for encoding uplink messages using the FrFFT) that rotates a Fourier transform by an angle alpha. In some examples, a base station may transmit, and the UE may receive, a set of angle parameters or a single angle parameter that the UE is to use for encoding an uplink message. In such examples, the UE may select an alpha value from the set of alpha values for encoding using the FrFFT. In some other examples, the UE may transmit an indication of a set of proposed angle parameters to the base station, and the base station may determine and indicate one of or a subset of the received set of proposed angle parameters to the UE. In some examples, the base station may indicate a correspondence between angle parameters and beam configurations (e.g., quasi co-location (QCL) configurations, or TCI states), and the UE may identify an alpha parameter value based on a subsequently indicated beam configuration (e.g., QCL configuration or TCI state). Note that QCL configuration or TCI state may be used as a specific example of a beam configuration, which may also be used herein. In some examples, the UE and the base station may communicate with each other, down selecting smaller and smaller subsets of an initial set of angle parameters.

Aspects of the disclosure are initially described in the context of wireless communications systems. Aspects of the disclosure are further illustrated by and described with reference to wireless communications systems, encoding schemes, operations, and process flows. Aspects of the disclosure are further illustrated by and described with reference to apparatus diagrams, system diagrams, and flowcharts that relate to generalization of encoding for uplink transmissions.

Figure 1:
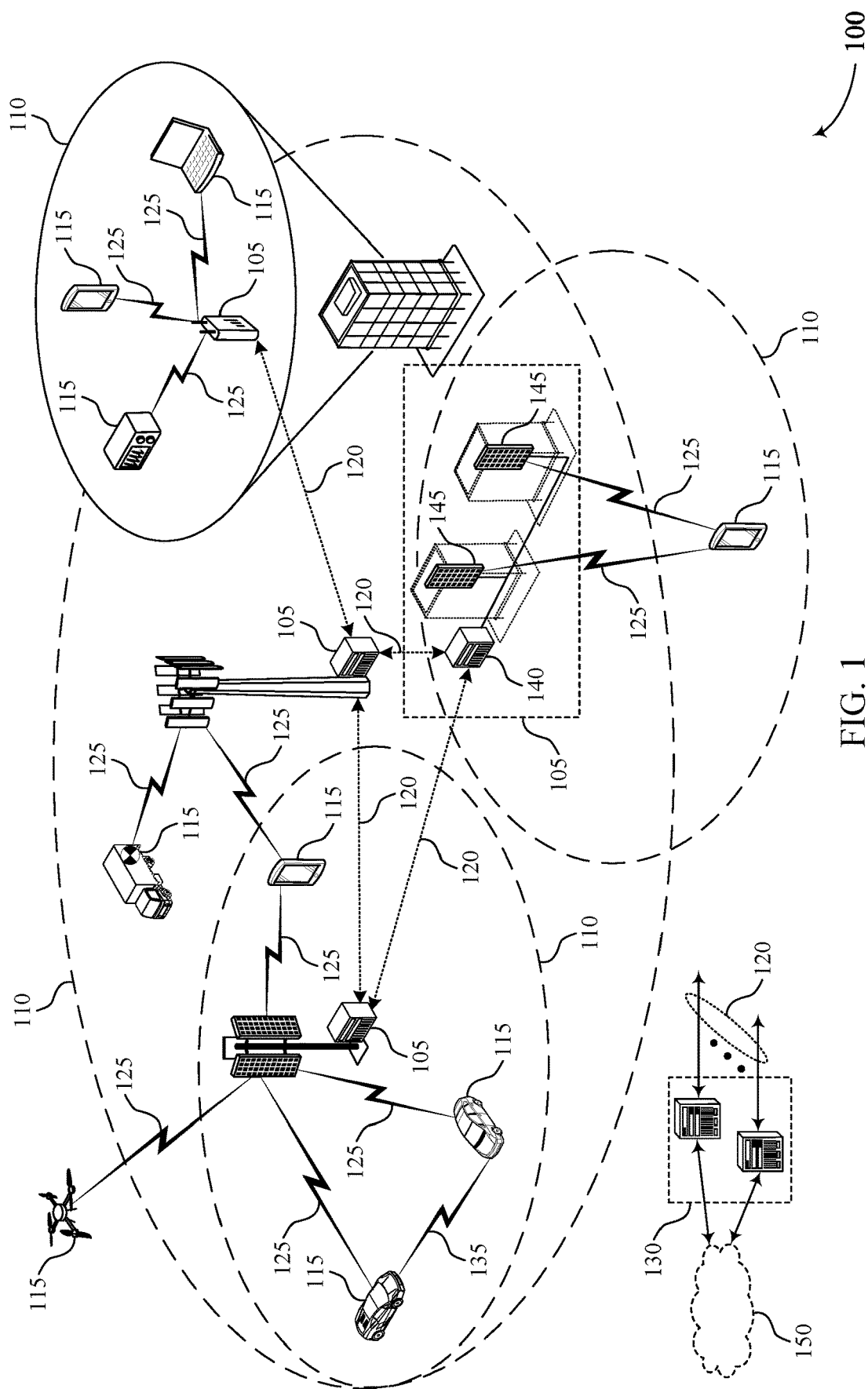
FIG. 1 illustrates an example of a wireless communications system that supports generalization of encoding for uplink transmissions in accordance with aspects of the present disclosure.

FIG. 1 illustrates an example of a wireless communications system 100 that supports generalization of encoding for uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may generalize DMRS-less sequence-based encoding techniques by using an FrFFT to encode data. FrFFT encoding may result in more flexibility than less flexible DFT encoding techniques. The UE may identify an angle parameter (e.g. alpha value for encoding uplink messages using the FrFFT) that rotates a Fourier transform by an angle alpha. In some examples, a base station 105 may transmit, and the UE 115 may receive, a set of angle parameters or a single angle parameter that the UE 115 is to use for encoding an uplink message. In such examples, the UE 115 may select an alpha value from the set of alpha values for encoding using the FrFFT. In some other examples, the UE 115 may transmit an indication of a set of proposed angle parameters to the base station, and the base station may determine and indicate one of or a subset of the received set of proposed angle parameters to the UE 115. In some examples, the base station may indicate a correspondence between angle parameters and beam configurations (e.g., QCL configurations, or TCI states), and the UE 115 may identify an alpha parameter value based on a subsequently indicated beam configuration (e.g., QCL configuration or TCI state). In some examples, the UE 115 and the base station may communicate with each other, down selecting smaller and smaller subsets of an initial set of angle parameters.

Figure 2:
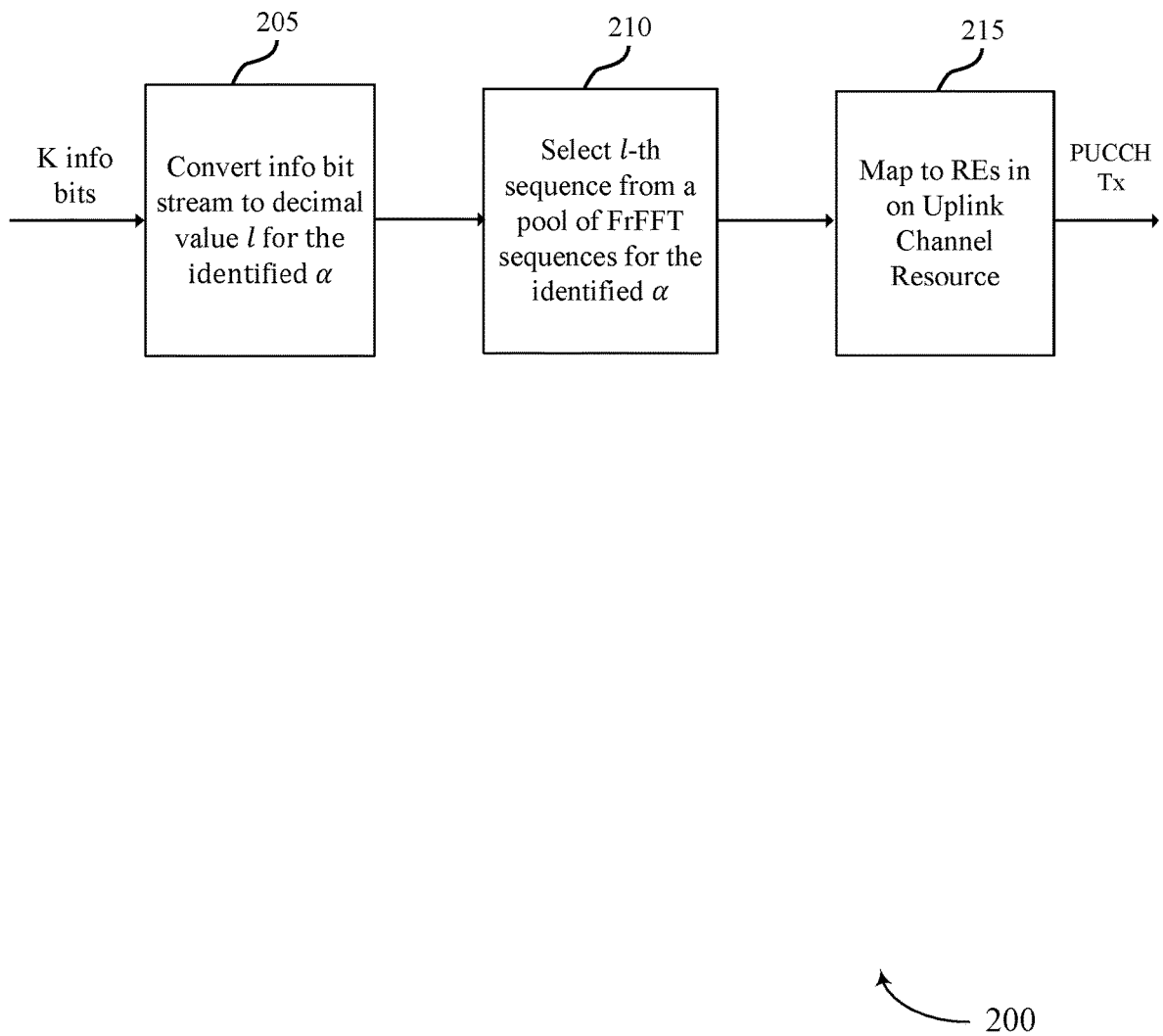
FIG. 2 illustrates an example of an encoding scheme that supports generalization of encoding for uplink transmissions in accordance with aspects of the present disclosure.

FIG. 2 illustrates an example of an encoding scheme 200 that supports generalization of encoding for uplink transmissions in accordance with aspects of the present disclosure. Encoding scheme may implement or be implemented by one more devices, such as a UE, a base station, or the like, which may be examples of corresponding devices described with reference to FIG. 1.

Some wireless communications systems may support sequence-based DMRS-less non-coherent transmission of uplink signaling (e.g., UCI on a PUCCH). In sequence-based DMRS-less non-coherent transmission, a UE, may utilize a DFT to encode the data and transmit it to a base station. However, utilizing DFT to encode data may limit flexibility and payload size (e.g., a number of bits that can be encoded in the transmission) in some circumstances (e.g., in cases of high speeds that result in high Doppler shifting).

Encoding scheme 200 describes techniques for performing FrFFT encoding between a UE and a base station. A UE may transmit information (e.g. UCI), with a payload of size K bits, to a base station over a channel (e.g. PUCCH) allocated for communication between the UE and the base station. In some cases, the UE may transmit the information (e.g. UCI) to the base station according to a DMRS-based coherent communication scheme. The UE may encode the K bits of information by channel coding the K bits of information. The UE may modulate the encoded K bits and generate a waveform. The UE may multiplex the information (e.g. UCI) with the a DMRS sequence and transmit the multiplexed UCI to the base station over the allocated channel (e.g. PUCCH).

In some cases, the channel may be associated with a low signal to noise ratio (SNR). In such cases DMRS-based coherent transmissions may experience performance loss due to DMRS overhead and decreased channel estimation quality. In addition, DMRS-based coherent transmission channel coding may suffer at a low rate. In these cases, sequence-based DMRS-less noncoherent transmission of information may improve efficiency and avoid performance degradation in demodulating and decoding.

In sequence-based DMRS-less non-coherent transmission, a UE may utilize a DFT to encode the UCI and transmit it to a base station over allocated PUCCH resources. The allocated resources may include a grid of time and frequency resources (e.g., a resource block), as well as the K number of bits on which to transmit the payload on. The UE may construct a sequence codebook with a size $2^K$, where K is the number of bits of the payload. In order to transmit a payload of K bits (e.g., a payload of $\{b_0, b_1, b_2, \ldots, b_{K-1}\}$), the UE may convert the payload bit stream into a decimal number 1, and transmit the $1^{th}$ codepoint in the constructed codebook. The UE may map the sequence to resource elements (REs) allocated in the PUCCH resources and transmit the payload to the base station over the allocated PUCCH. Sequence-based DMRS-less noncoherent transmission may support UCI greater than one bit by using orthogonal sequences for small payload sizes and non-orthogonal sequences for medium to large payload sizes. For example, if a payload size is less than or equal to a floor function of logarithm base two of the number of allocated REs, then the UE may use orthogonal sequences for encoding. If the payload size is greater than the floor function of logarithm base two of the number of allocated REs, then the UE may use non-orthogonal sequences for encoding.

However, utilizing DFT to encode data may limit flexibility and payload size (e.g., a number of bits that can be encoded in the transmission) in some circumstances (e.g., in cases of high speeds that result in high Doppler shifting). In some cases, a UE may generalize a DFT encoding technique by using an FrFFT to encode data. FrFFT encoding may result in more flexibility than less flexible DFT encoding techniques and improve transmission quality for doubly selective channels. In some examples, by using the more generalized and flexible encoding techniques, the UE may use more encoding bits, and may perform better in high Doppler cases while maintaining the same implementation complexity. To perform the generalized encoding techniques, the UE may identify an angle parameter (e.g. alpha value for encoding uplink messages using the FrFFT) that rotates a Fourier transform by an angle alpha. In order to determine the angle parameter, the alpha value is calculated, where, for any real alpha, the alpha angle fractional Fourier transform of a function is calculated according to Equation 1 below:

$$[f](u) = \sqrt{1 - i\cot(a)e^{i\pi \cot(a)u^2}} \int_{-\infty}^{\infty} e^{-i2\pi\left(\csc(a)ux - \frac{\cot(a)}{2}x^2\right)} f(x)dx \quad (1)$$

The fractional Fourier transform may utilize a chirp basis where the $\sqrt{1-i\cot(\alpha)e^{i\pi\cot(\alpha)u^2}}$ of Equation 1 may represent a chirp signal in the frequency domain $$\frac{\cot(a)}{2}x^2$$

of Equation 1 may represent a chirp signal in the time domain. The chirp basis of the fractional Fourier transform may reduce timing and frequency errors in FrFFT encoded transmissions. In addition, where alpha equals $$\frac{\pi}{2},$$

a conventional Fourier transform may be obtained, and where alpha equals $$-\frac{\pi}{2},$$

an inverse of the conventional Fourier transform may be obtained. A decoding receiving device (e.g., a base station) may rely on these properties to correctly identify and decode uplink transmissions encoded using the FrFFT encoding techniques described herein.

The addition of the alpha value in FrFFT encoding allows for the flexibility and additional encoding bits of FrFFT encoding. For example, in order to successfully decode a message that was encoded using FrFFT, the correct angle parameter (e.g. alpha value), must be used by the receiver. Therefore, the angle parameter used to encode a message may be used as a type of identifier. Using FrFFT may also allow for an increase in the amount of bits that may be transmitted in an uplink message. For example, more bits may be leveraged by allowing the UE to be assigned multiple alpha parameters (e.g. alpha values), which may result in increased bit rate. The angle parameters (e.g. alpha values) may also decrease interference at the base station. For example, different angle parameters (e.g. alpha values) may be assigned to or selected by different UEs, which may decrease interference between UEs at the receiving base station. In addition, with the appropriate selection of the alpha parameter, performance may be improved for doubly selective channels, and for high doppler applications by optimizing the alpha parameters to obtain a codebook for the UE to maximize performance.

In order to construct a codebook using the angle parameter (e.g. alpha value), resources may be allocated for the UE to transmit information (e.g. UCI) with a given payload of size K bits over a channel (e.g. PUCCH) to a base station. The allocated resources may include a grid of time and frequency resources (e.g., a resource block), as well as the K number of bits on which to transmit the payload on, as described in further detail in FIG. 3. The UE may construct a sequence codebook with a size $2^K$, where K is the number of bits of the payload, as described in further detail in FIG. 4.

To transmit a payload of K bits (e.g., a payload of $\{b_0, b_1, b_2, \ldots, b_{K-1}\}$), at 205, the UE may convert the payload bit stream into a decimal number l for the identified angle parameter (e.g. alpha value). At 210, the UE may select the $l^{th}$ sequence of length N, where N may be the number of OFDM symbols, for the identified angle parameter (e.g. alpha value). The $l^{th}$ sequence may be chosen from a pool of FrFFT sequences for the identified angle parameter (e.g. alpha value) or set of angel parameters (e.g., set of alpha values), as described in further detail in FIGS. 4-5. At 215, the UE may map the $l^{th}$ sequence for the identified angle parameter (e.g. alpha value) to N REs in the allocated PUCCH resources and transmit the UCI to the base station over the PUCCH.

to the UE may identify the angle parameter (e.g. alpha value) in a variety of ways, as described in greater detail with reference to FIGS. 6 and 7.I In some examples, a base station may transmit, and the UE may receive, a set of angle parameters or a single angle parameter that the UE is to use for encoding an uplink message. In such examples, the UE may select an alpha value from the set of alpha values for encoding using the FrFFT. In some examples, the UE may transmit an indication of a set of proposed angle parameters to the base station, and the base station may determine and indicate one of or a subset of the received set of proposed angle parameters to the UE. In some examples, the base station may indicate a correspondence between angle parameters and QCL configurations, or transmission configuration indicator (TCI) states, and the UE may identify an alpha parameter value based on a subsequently indicated QCL configuration or TCI state. In some examples, the UE and the base station may communicate with each other, selecting smaller and smaller subsets of an initial set of angle parameters.

Figure 3:
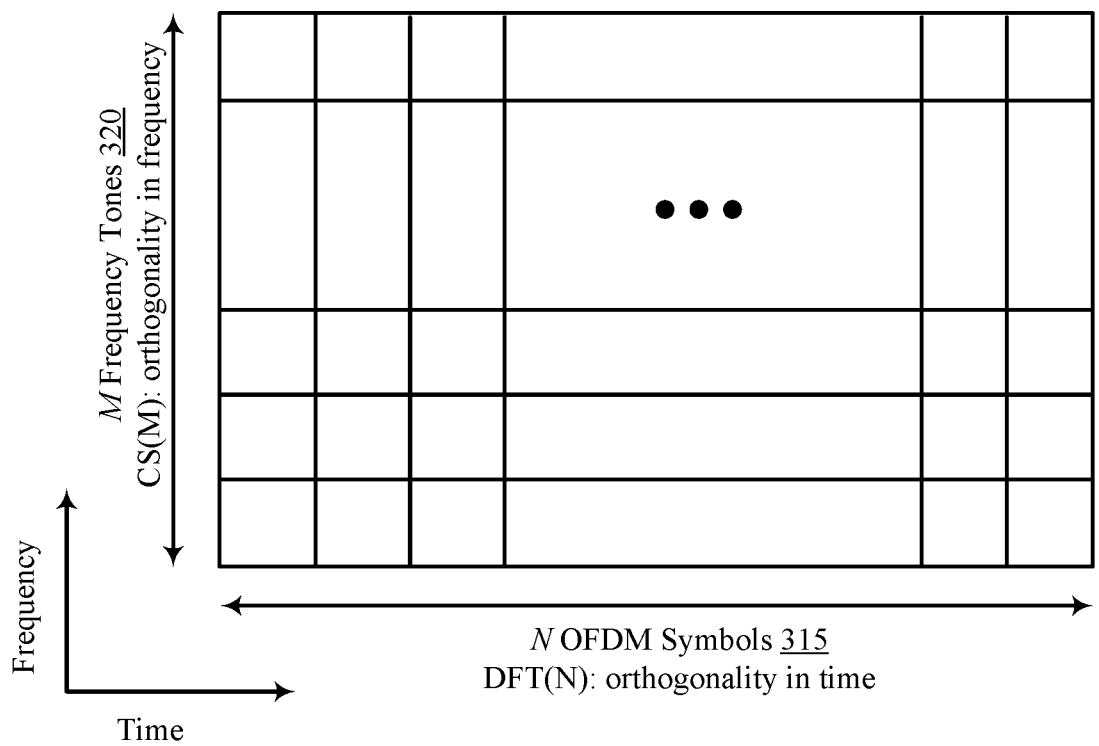
FIG. 3 illustrates an example of a wireless communications system that supports generalization of encoding for uplink transmissions in accordance with aspects of the present disclosure.

FIG. 3 illustrates an example of a wireless communications system 300 that supports generalization of encoding for uplink transmissions in accordance with aspects of the present disclosure. In some examples, wireless communications system 300 may implement aspects of wireless communications system 100. The wireless communications system 300 may include a UE and a base station, which may be examples of corresponding devices as described herein. The UE and the base station may communicate via a communication link within a geographic coverage area. In some examples, the UE may transmit a signal including information (e.g., a payload 310) to the base station via the communication link. The payload 310 may occupy a resource allocation of N OFDM symbols 315 and M frequency tones 320 and the UE may convey the payload 310 using a sequence from a set of sequences based on the N OFDM symbols 315 and the M frequency tones 320. In some examples, the set of sequences may include orthogonal sequences or non-orthogonal sequences (or both). In some cases, the set of sequences may include orthogonal sequences when a size of the payload does not satisfy (e.g., is below, or is at or below) a payload threshold. In some cases, the set of sequences may include non-orthogonal sequences when the size of the payload satisfies (e.g., is above, or is at or above) the payload threshold.

As described herein, N may correspond to any number, but may sometimes be defined within the range of 1 to 14. Similarly, M may correspond to any number, but may sometimes be defined within the range of 1 to 12. In some cases, such as when N=14 and M=12, the resource allocation may be a resource block. Further, as described herein, the payload 310 may be an example of any signal including information (e.g., a number of bits) and, although described in the context of transmission from the UE, may be transmitted by either the UE or the base station. In some examples, the payload 310 may be an example of UCI and, accordingly, the UE may transmit the payload 310 in a resource allocation of a PUCCH. In such examples, the N OFDM symbols 315 and the M frequency tones 320 may correspond to a time and frequency resource grid assigned to the PUCCH for UE to transmit the payload 310.

In some examples, the UE may use one or more non-orthogonal sequences (or codepoints) to convey the payload 310. For example, the UE may generate or be configured with a codebook of non-orthogonal sequences and the UE may select one or more non-orthogonal sequences from the codebook to convey the payload 310.

In some examples, the UE or the base station, or both, may generate a number of orthogonal sequences based on the resources allocated for the payload 310. For example, the UE and the base station may communicate via a resource allocation of a communication channel and the UE, or the base station, or both, may generate a number of orthogonal sequences based on the resource allocation. For instance, the base station may allocate N OFDM symbols 315 and M frequency tones 320 for transmission of the payload 310 and, accordingly, the UE or the base station, or both, may generate a number of orthogonal sequences, for example, equal to N*M. In some aspects, each orthogonal sequence of the set of orthogonal sequences may have a length equal to the size of the resource allocation (e.g., the number of resource elements in the resource allocation, or N*M), such that each orthogonal sequence may convey the payload 310 across the resource allocation. As such, in some examples, the UE, or the base station, or both, may generate a set of N*M orthogonal sequences and each orthogonal sequence may be associated with a length of N*M. The generation of the set of orthogonal sequences is described in more detail with reference to FIG. 3.

In some examples, a network device (e.g., base station or UE) may generate multiple sequences based on a Kronecker product of a DFT matrix having a number of time periods in a resource allocation and a cell-specific base sequence having a length corresponding to a number of frequency tones in the resource allocation (e.g., as described with reference to FIGS. 4 and 5). The multiple sequences may be configured for conveying data based on a channel condition of a channel (e.g., a condition of an uplink channel, condition of a physical uplink control channel, condition of a physical uplink shared channel, etc.). In some cases, each sequence may be mapped to a particular sequence of bits (e.g., each possible combination of a sequence of bits from a 7-bit sequence of data mapped to a particular sequence from the multiple sequences). In some examples, the base station may receive, over a channel, one or more transmissions from UE and determine a configuration for repeating a sequence from the multiple sequences over a resource allocation, where the sequence is selected based on the sequence of bits in the data. The base station may transmit, to UE, an indication of the configuration to configure UE to repeat a sequence over the resource allocation (repeat the sequence in the time domain, or frequency domain, or both), where the sequence may be for data transmitted to base station by UE over an uplink channel.

The UE, implementing the described techniques, may construct a codebook of sequences and select one of the sequences to convey the payload 310 based on the number of bits in the payload 310. However, constructing a codebook with limited flexibility (e.g., a DFT encoding scheme without utilizing flexible angle parameters) may limit the flexibility of DFT encoding and the number of bits that may be used when encoding. Therefore, a generalized DFT encoding scheme, such as FrFFT encoding, which may utilize an angle parameter (e.g. alpha value), may increase flexibility and the number of encoding bits, among other advantages. in such examples, the UE may select the sequences, map the sequences to resource elements, or both, based on identified alpha values, resulting in increased flexibility and payload size, decreased interference, and improved UE performance.

FIG. 4 illustrates an example of an orthogonal matrix 401 and a base sequence 405 that supports generalization of encoding for uplink transmissions in accordance with aspects of the present disclosure. In some examples, orthogonal matrix 401 and base sequence 405 may be implemented by or may implement aspects of wireless communications system 100 and encoding scheme 200. For example, a UE 115, or a base station 105, or both, may use the orthogonal matrix 401 and the base sequence 405 to generate a set of orthogonal sequences from which the UE 115a may select an orthogonal sequence to convey a payload to the base station 105. The UE 115 and the base station 105 may be examples of corresponding devices as described herein.

The orthogonal matrix 401, which may be referred to as W, may be an orthogonal, square matrix of size N (i.e., an N×N matrix). In some implementations, N may be equal to the number of symbols of a resource allocation associated with transmission of the payload, as described in more detail with reference to FIG. 2. Further, in some specific examples, the orthogonal matrix 401 may be a DFT matrix and, as such, may be referred to as a DFT matrix. Accordingly, a row or a column of the orthogonal matrix 401 (e.g., a vector) may be referred to as either $\overline{w}$ (n) or $\overline{DFT}$ (n), where n is an index of the row or the column of the orthogonal matrix 401 (e.g., the $n^{th}$ row or column). Although FIG. 3 illustrates n=1, n may be equal to any number n=0, 1, 2, ..., N−1. A row of the orthogonal matrix 401 is defined by Equation 2, shown below.

$$\overline{DFT}(n) = [\omega^{0n}, \omega^{1n}, \omega^{2n}, \ldots, \omega^{in}, \ldots, \omega^{(N-1)n}] \quad (2)$$

The corresponding column of the orthogonal matrix 401 may be equal to $\overline{DFT}(n)^T$. In Equation 2, ω may be defined as either $\omega = e^{-j2\pi/N}$ or $\omega = e^{j2\pi/N}$. Each column of the vector $\overline{DFT}$ (n) (or each row of the vector $\overline{DFT}(n)^T$) may correspond to an OFDM symbol index i, where i=0 in the first column (i.e., the left-most column) of the orthogonal matrix 401 and increments by one to i=N−1 in the last column (i.e., the right-most column) of the orthogonal matrix 401. In some cases, an OFDM symbol index i may correspond to an OFDM symbol of the resource allocation that the UE 115 may use to transmit the payload. In some cases, the phase ramp of a row or a column of the orthogonal matrix 401 may be defined as i*n, where i is the OFDM symbol index and n may describe the slope of the phase change. As such, a column or a row of the orthogonal matrix 401 may include entries for each OFDM symbol of the resource allocation in one frequency tone.

The base sequence 405, which may be referred to as a base sequence $\tilde{s}$ (m), may be a cyclically shifted frequency-domain base sequence. In other words, the base sequence 405 may be a frequency-domain base sequence S associated with a cyclic shift in the time-domain. As such, the base sequence S may be based on a cyclic shift index m, where m=0, 1, 2, ..., M−1. In some aspects, M may be equal to the number of frequency tones of a resource allocation associated with the transmission of the payload, as described in more detail with reference to FIG. 2. The base sequence S may be associated with a phase ramp vector in the frequency domain, such as $e^{-j2\pi lm/M}$ or $e^{j2\pi lm/M}$, and the phase ramp vector and the base sequence S may be multiplied together to determine the base sequence $\tilde{s}$ (m), as shown by base sequence 405.

For example, the UE 115, or the base station 105, or both, may perform a DFT or a fast Fourier transform (FFT) of the base sequence S in the frequency-domain to convert the base sequence S to the time-domain, where the time-domain representation of the base sequence S, which may be referred to as $\tilde{s}$, has a length M. The UE 115, or the base station 105, or both, may apply a cyclic shift index m to $\tilde{s}$ to shift $\tilde{s}$ by index m, which may adjust (e.g., effectively move) the entries of S forward or backward by m in a cyclic fashion. The time-domain cyclic shift may correspond to the frequency-domain phase ramp vector $e^{-j2\pi lm/M}$ or $e^{j2\pi lm/M}$. The index m of the phase ramp may correspond to a slope of the phase ramp (e.g., the phase ramp may be defined as m/M) and the index l may correspond to a tone index of the resource allocation. As shown in base sequence 405, S(0), S(1), S(2), ..., S(l), ..., S(M−1) may correspond to entries of the base sequence S for each frequency tone l=0, 1, 2, ..., M−1. Accordingly, the base sequence 405 may include entries for each frequency tone of the resource allocation in one OFDM symbol.

In some cases, the base sequence 405 may be a cell-specific base sequence, such that each UE 115 within a cell of the base station 105 (e.g., within a geographic coverage area of the base station 105) may use the same base sequence 405. Further, in some cases, the base sequence 405 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 405.

As illustrated in FIG. 3, the base sequence 405 may be a vector of size M×1. Additionally, there may be a number of base sequences 405 equal to the number of cyclic shift indices associated with the base sequence 405. For instance, there may be M base sequences 405 (i.e., one base sequence $\tilde{s}$ (m) for each of m=0, 1, 2, ..., M−1). Further, each row of the base sequence 405 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a number of base sequences 405 (e.g., a number equal to M) may be considered, and the number of base sequences 405 may be visualized as a matrix of base sequences $\tilde{s}$ (m) of dimensions M×M (e.g., M cyclic shifts×M frequency tones).

As described herein, the UE 115, or the base station 105, or both, may generate a set of orthogonal sequences. In some examples, the UE 115, or the base station 105, or both, may generate a number of orthogonal sequences based on a product, such as a Kronecker product, of the orthogonal matrix 401 and each of the number of base sequences 405. The Kronecker product of the orthogonal matrix 401 and each of the number of base sequences 405 may involve determining the Kronecker product of each row or column n of the orthogonal matrix 401 and each cyclic shift index m of the base sequence 405, and repeating the operation for all permutations of n and m, where n=0, 1, . . . , N−1 and m=0, 1, . . . , M−1.

As such, the number of orthogonal sequences in the set may be equal to the product of the dimensions of the orthogonal matrix 401 and a matrix representation of the base sequences 405. For instance, the orthogonal matrix 401 may be a matrix of size N×N and the base sequences 405 may be represented by a matrix of size M×M and, therefore, the Kronecker product between the two may result in an (N*M)×(N*M) matrix (e.g., an orthogonal (N*M)×(N*M) matrix). In other words, the UE 115, or the base station 105, or both, may generate a number of orthogonal sequences equal to N*M and each orthogonal sequence may have a length of N*M. As such, each orthogonal sequence may have a length equal to the number of resource elements (e.g., the number of OFDM symbol×frequency tone resource elements) included in the resource grid that is allocated to the UE 115 for transmission of the payload. Further, based on using a Kronecker product of the orthogonal matrix 401 and the base sequence 405, the signal transmitted on each OFDM symbol may have the same PAPR as the base sequence 405, which may improve the coverage area of the UE 115 because the UE 115 may drive a power amplifier to a set power ratio and use a maximum transmit power of the UE 115 to transmit the signal, among other advantages.

In some examples, a UE 115 may perform the techniques described with reference to FIG. 4 in a more flexible manner, relying on angle parameters (e.g., alpha values) to increase flexibility and payload size, as described in greater detail with reference to FIG. 2. The UE may identify the angle parameters as described in greater detail with reference to FIGS. 6 and 7. In some examples, the UE may utilize techniques described with reference to FIG. 4, and may perform an operation (e.g., a Kronecker product) to generate an orthogonal sequence for a multi-bit payload.

Figure 5:
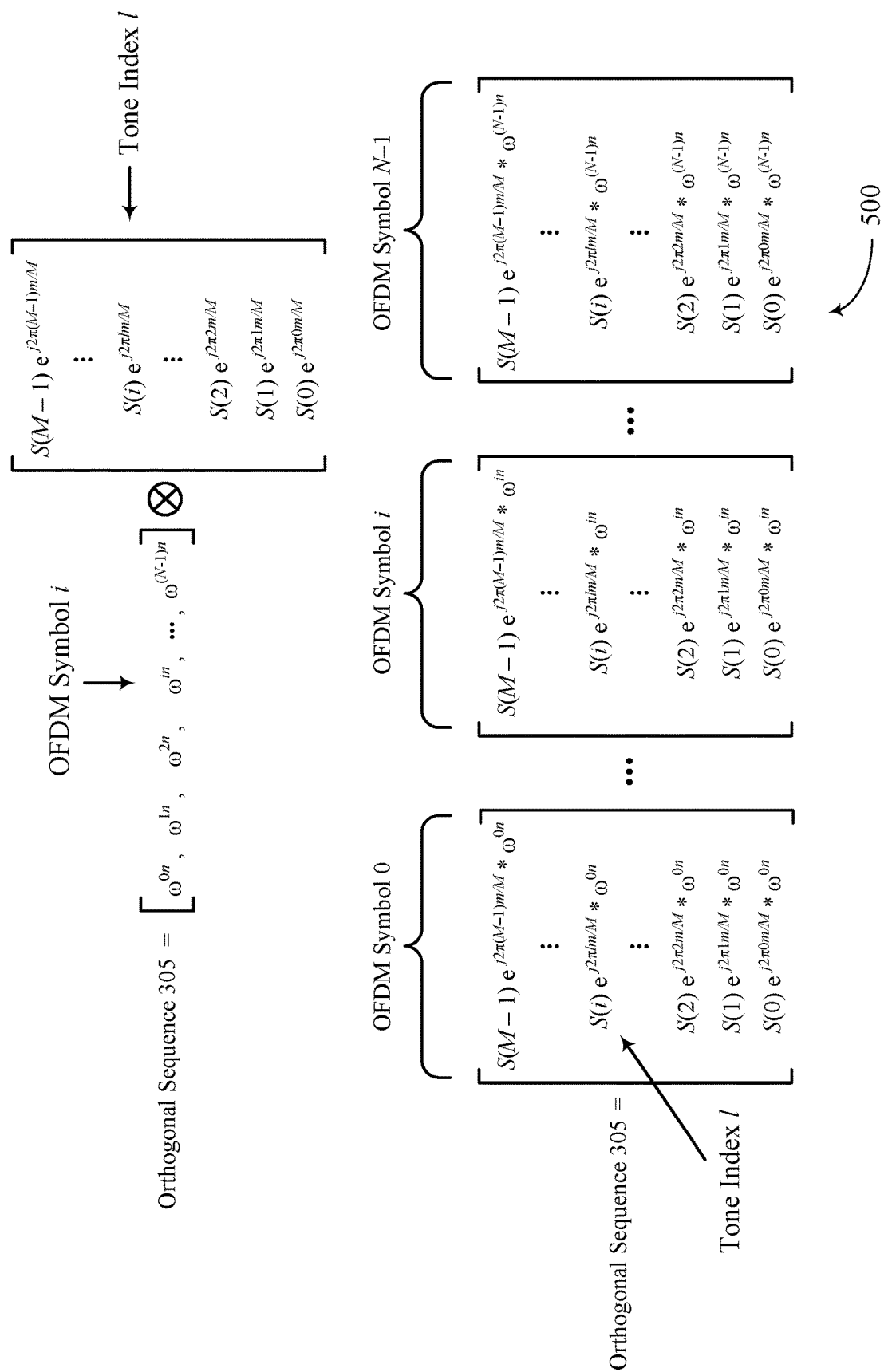
FIG. 5 illustrates an example of an operation that supports generalization of encoding for uplink transmissions in accordance with aspects of the present disclosure.

FIG. 5 illustrates an example of an operation 500 that supports generalization of encoding for uplink transmissions in accordance with aspects of the present disclosure. The operation 500 may be an example of a Kronecker product of a row or a column (e.g., a vector) of the orthogonal matrix 401 and a base sequence 405, as described with reference to FIG. 4. In some examples, a UE 115 or a base station 105, or both, which may be examples of corresponding devices as described herein, may perform the operation 500 to determine an orthogonal sequence 505 (e.g., a sequence that is orthogonal in time and frequency). The UE or the base station, or both, may determine the orthogonal sequence 505 when generating the set of orthogonal sequences (e.g., the N*M orthogonal sequences), as described in more detail with reference to FIG. 4. For example, the operation 500 may illustrate a step or an operation of the generation of the set of orthogonal sequences and, as such, the operation 500 may be similarly performed for each unique pair of row or column index n of the orthogonal matrix 401 and cyclic shift index m of the base sequence 405. For instance, the UE 115 or the base station 105, or both, may perform the operation 500 N*M times (e.g., to generate N*M orthogonal sequences 505).

The UE 115 or the base station 105, or both, may determine a row or a column index n of the orthogonal matrix 401 from the N−1 row and column indices of the orthogonal matrix 401 and a cyclic shift index m of the base sequence 405 from the M−1 cyclic shift indices of the base sequence 405. In other words, the UE 115 or the base station 105, or both, may determine the vector corresponding to the row or the column index n of the orthogonal matrix 401, which may be referred to as $\overrightarrow{DFT}(n)$ and be defined by Equation 2, and the vector corresponding to the cyclic shift index m of base sequence 405, which may be illustrated by base sequence $\vec{s}(m)$ (e.g., base sequence 405 may illustrate $\vec{s}$ (cyclic index=m)).

The UE 115 or the base station 105, or both, may determine the Kronecker product of $\overrightarrow{DFT}(n)$ and $\vec{s}(m)$ to determine the orthogonal sequence 505. The Kronecker product is defined such that the base sequence $\vec{s}(m)$ is multiplied by each column of $\overrightarrow{DFT}(n)$ if $\overrightarrow{DFT}(n)$ is a row vector or by each row of $\overrightarrow{DFT}(n)$ if $\overrightarrow{DFT}(n)$ is a column vector. For instance, the Kronecker product of $\overrightarrow{DFT}(n)$ and $\vec{s}(m)$ may be defined by Equation 3, shown below and in expanded form in FIG. 3B.

$$\overrightarrow{DFT}(n) \otimes \vec{s}(m) = [\omega^{0n} * \vec{s}(m), \omega^{1n} * \vec{s}(m), \quad (3)$$
$$\omega^{2n} * \vec{s}(m), \ldots \omega^{in} * \vec{s}(m), \ldots, \omega^{(N-1)n} * \vec{s}(m)]$$

In some implementations, such as when $\overrightarrow{DFT}(n)$ and $\vec{s}(m)$ are either both row vectors or both column vectors, Equation 3 may generate a (N*M)×1 orthogonal sequence 505 (in the case that $\overrightarrow{DFT}(n)$ and $\vec{s}(m)$ are column vectors) or an 1×(N*M) orthogonal sequence 505 (in the case that $\overrightarrow{DFT}(n)$ and $\vec{s}(m)$ are row vectors). Alternatively, in some other implementations, $\overrightarrow{DFT}(n)$ may be a row vector and $\vec{s}(m)$ may be a column vector. In such implementations, Equation 3 may generate an orthogonal sequence of dimensions N×M. In such implementations, the UE or the base station, or both, may concatenate each column below the lowest entry of the previous column to effectively generate a (N*M)×1 orthogonal sequence 505. The UE or the base station, or both, may perform such concatenation so that the orthogonal sequence 505 is represented as a column (or a row) and may be indexed in a codebook. In either implementation, each entry in the orthogonal sequence 505 may be associated with a unique (i, l) pair, where i may correspond to an OFDM symbol index of the N OFDM symbols of the resource allocation and l may correspond to a frequency tone index of the M frequency tones in the resource allocation. Accordingly, regardless of the specific implementation, the UE or the base station may map the generated orthogonal sequence 505 to the allocated resource grid such that an entry of the orthogonal sequence 505 corresponding to a unique (i, l) pair maps to a resource element of the resource grid associated with the (i, l) pair (e.g., the resource element at the $i^{th}$ OFDM symbol and the $l^{th}$ frequency tone of the resource grid).

In some examples, an OFDM symbol index i=0 may correspond to the first OFDM symbol (e.g., the temporally earliest) of the resource allocation and a frequency tone index i=0 may correspond to the lowest frequency tone (e.g., the lowest frequency subcarrier) of the resource allocation. Likewise, an OFDM symbol index i=N−1 may correspond to the last (e.g., the temporally latest) OFDM symbol of the resource allocation and a frequency tone index i=M−1 may correspond to the highest frequency tone (e.g., the highest frequency subcarrier) of the resource allocation.

Such generation of a set of orthogonal sequences 505 may be correspond a spreading of the base sequence 405 in the time-domain (e.g., based on a CDMA concept) via the orthogonal matrix 401 (e.g., using a DFT vector in the time-domain) and a phase ramping in the frequency-domain based on the cyclic shift index of the base sequence 405. The phase ramping in the frequency-domain may correspond to (e.g., be equivalent to) a cyclic shift in the time-domain. In the case that the orthogonal matrix is a DFT matrix, the described techniques may also correspond to a DFT-based orthogonal cover code and cyclic shift-based multiplexing representation of the payload for a single user. Further, the implementations of the present disclosure may correspond to an index modulation scheme using N DFT dimensions and M cyclic shift dimensions to carry a number of bits based on the N and M dimensions. For instance, such an index modulation scheme may carry the payload based on an on-off pattern on the N*M tones of the orthogonal sequence 505. When using index modulation, the UE may convey different information by using different on-off patterns on the N*M tones of the orthogonal sequence 505. In some examples, the described techniques may be implemented to carry $\log_2(N*M)$ bits based on having N DFT dimensions and M cyclic shift dimensions (e.g., an orthogonal sequence 505 of length N*M generated by the orthogonal matrix 401 and the base sequence 405 may carry $\log_2(N*M)$ bits).

As such, the UE or the base station, or both, may determine the orthogonal sequence 505 that may convey a payload across the resources allocated for the transmission of the payload. The UE 115 or the base station 105, or both may repeat the operation 500 for each unique pair of row or column index n of the orthogonal matrix 401 and each cyclic shift index m of the base sequence 405 (i.e., each unique (n, m) pair) to generate N*M orthogonal sequences 505, where each of the N*M orthogonal sequences 505 may convey the payload across each resource element in the resource grid defined by N OFDM symbols and M frequency tones. In some implementations, the UE or the base station, or both, may construct a codebook of a subset of the N*M orthogonal sequences 505 based on the number of bits in the payload.

In some examples, generation of sequences as described herein may be limited in flexibility (e.g., may not utilize different angle parameters for rotating Fourier transforms). However, by performing the techniques described with reference to FIGS. 3-5 by including an angle parameter (e.g., alpha value) as described with reference to FIG. 2, a UE may more flexibly and effectively encode larger payloads, decrease interference, and improve performance in various scenarios (e.g., in cases of high speed mobility resulting in increased Doppler). The UE may identify angle parameters for improved encoding in various ways and based on various signaling, as described in greater detail with reference to FIGS. 6 and 7.

Figure 6:
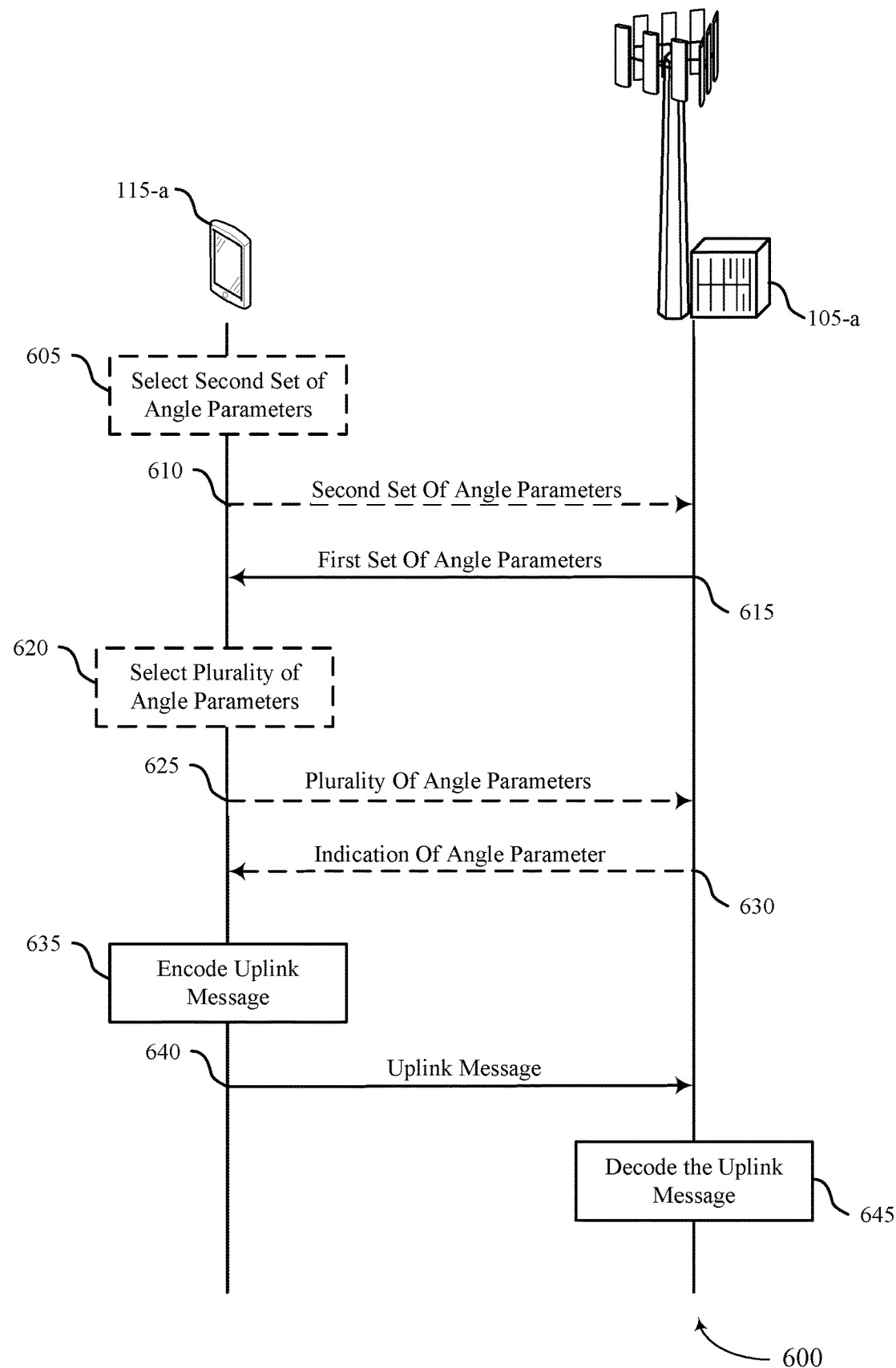
FIG. 6 illustrates an example of a process flow that supports generalization of encoding for uplink transmissions in accordance with aspects of the present disclosure.

FIG. 6 illustrates an example of a process flow 600 that supports generalization of encoding for uplink transmissions in accordance with aspects of the present disclosure. Process flow 600 may include a UE 115-a and a base station 105-a, which may be examples of corresponding devices described with reference to FIGS. 1-5.

In some examples, base station 105-a may provide, to UE 115-a, an indication of a set of angle parameters for use in generalized encoding of an uplink message. For example, at 615, base station 105-a may transmit, and UE 115-a may receive, an indication of a first set of angle parameters (e.g., alpha values representing a rotational value for an FrFFT) for UE 115-a to use for an FrFFT. Base station 105-a may include the indication of the first set of alpha values in an RRC message, a MAC CE message, a DCI message, or any combination thereof. In some examples, the first set of angle parameters may include a single alpha value, which UE 115-a may utilize in encoding an uplink message at 635. In some examples, the first set of alpha values may include multiple alpha values, and UE 115-a may select an alpha value (e.g., based on one or more rules or conditions, channel conditions, or an explicit instruction from the base station 105-a, or the like). In some examples, UE 115-a may select the angle parameter from the set of angle parameters, or may signal back and forth with base station 105-a to identify the angle parameter, as described in greater detail herein with reference to FIG. 6, or may identity a correspondence between alpha values and one or more configurations or conditions, as described in greater detail with reference to FIG. 7.

At 635, UE 115-a may encode an uplink message (e.g., a UCI message on a PUCCH, a data message on a PUSCH, or the like) using the FrFFT based on the angle parameter. UE 115-a may encode the uplink message as described with reference to FIGS. 3-5. For example, UE 115-a may convert a set of information bits for the uplink message to a decimal value (e.g., a decimal value l) based on the angle parameter. UE 115-a may select a sequence from a pool of sequences (e.g., as described in greater detail with reference to FIGS. 3-4) based at least in part on the angle parameter. UE 115-a may then map the selected sequence to one or more resource elements on the uplink channel. In some examples, UE 115-a may encode the uplink message using a single angle parameter. Thus, techniques described herein may be described with reference to selecting an angle parameter from a set of angle parameters. In some examples, UE 115-a may encode the uplink message using multiple angle parameters (e.g., selecting sequences from a pool of sequences based on multiple alpha values, or mapping the sequences to the resource elements of an uplink channel using multiple alpha values). In such examples, UE 115-a may not select an angle parameter from a set of selected or indicated angle parameters, and may instead use each angle parameter of the set of selected or indicated angle parameters. Thus, no example described herein that refers to selecting an angle parameter should be understood as limiting the embodiment to only utilizing one angle parameter (as in some examples each angle parameter of a set of angle parameters may be used in encoding the uplink message).

At 640, UE 115-a may transmit, and base station 105-a may receive, the uplink message on the uplink channel. The uplink message may be encoded using the FrFFT. At 645, base station 105-a may decode the uplink message received at 640. For example, base station 105-a may select the angle parameter, and may use the angle parameter to correctly decode the encoded uplink message. For example, base station 105-a may identify a correct decoding parameter (e.g., angle value β corresponding to angle parameter a such that $F_{\alpha+\beta}=F_\alpha$ and $F_\beta F_{-\beta}=1$), and may use the decoding parameter to successfully decode the uplink message received at 640.

In some examples, base station 105-a may explicitly indicate an angle parameter for use in encoding the uplink message. For example, at 615, base station 105-a may transmit, and UE 115-a may receive, the first set of angle parameters. At 630, base station 105-a may transmit, and UE 115-a may receive, an indication of one angle parameter from the first set of angle parameters. In such examples, UE 115-a may use the indicated single angle parameter of the first set of angle parameters for encoding the uplink message at 635.

In some examples, UE 115-*a* may suggest a best set of angle parameters to base station 105-*a*. UE 15-*a* may select the best or proposed set of angle parameters (e.g., based on channel conditions, current mobility and speed of UE 115-*a* (e.g., resulting in a Doppler estimation), or the like, at 605. At 610, UE 115-*a* may transmit the selected second set of angle parameters to base station 105-*a*. UE 115-*a* may transmit the second set of angle parameters in a control message on a PUCCH, in a data message on a PUSCH, in a MAC-CE, or the like. Base station 105-*a* may then select and transmit the first set of angle parameters to UE 115-*a* at 615 based on receiving the second set of angle parameters at 610. In some examples, base station 105-*a* may select a subset of the second set of angle parameters, and may indicate the subset of the second set of angle parameters (e.g., the first set of angle parameters) at 615. In some examples, base station 105-*a* may reject the proposed second set of angle parameters, and may instead indicate different angle parameters (e.g., the first set of angle parameters) at 615. In some examples, base station 105-*a* may select a single angle parameter from the second set of angle parameters, and may indicate the angle parameter f the second set of angle parameters at 630.

In some examples, UE 115-*a* and base station 105-*a* may signal back and forth to down select an angle parameter or set of angle parameters from a larger set of angle parameters. For example, at 605, UE 115-*a* may select a second set of angle parameters (e.g., a large set of angle parameters or a combination of sets of angle parameters), and may indicate the second set of angle parameters to base station 105-*a* at 115-*a*. In some examples, base station 105-*a* may transmit the first set of angle parameters at 615 in response to receiving the second set of angle parameters at 610. Base station 105-*a* may reject the proposal of the second set of angle parameters indicated at 610, or may select a subset of the second set of angle parameters (e.g., the first set of angle parameters includes a subset of the second set of angle parameters). At 620, UE 115-*a* may select a plurality of angle parameters from the first set of angle parameters. At 625, UE 115-*a* may transmit, and base station 105-*a* may receive, an indication of the plurality of angle parameters. Base station 105-*a* may select a single angle parameter from the plurality of angle parameters, and may transmit an indication of the angle parameter to UE 115-*a* at 630. At 635, UE 115-*a* may use the angle parameter indicated at 630 to encode the uplink message for transmission at 640.

In some examples, UE 115-*a* may use an angle parameter for encoding the uplink message based on correspondence between one or more configurations (e.g., TCI state configurations, QCL configurations) and angle parameters, correspondence between channel conditions and angle parameters, Doppler estimations, or the like, as described in greater detail with reference to FIG. 7.

Figure 7:
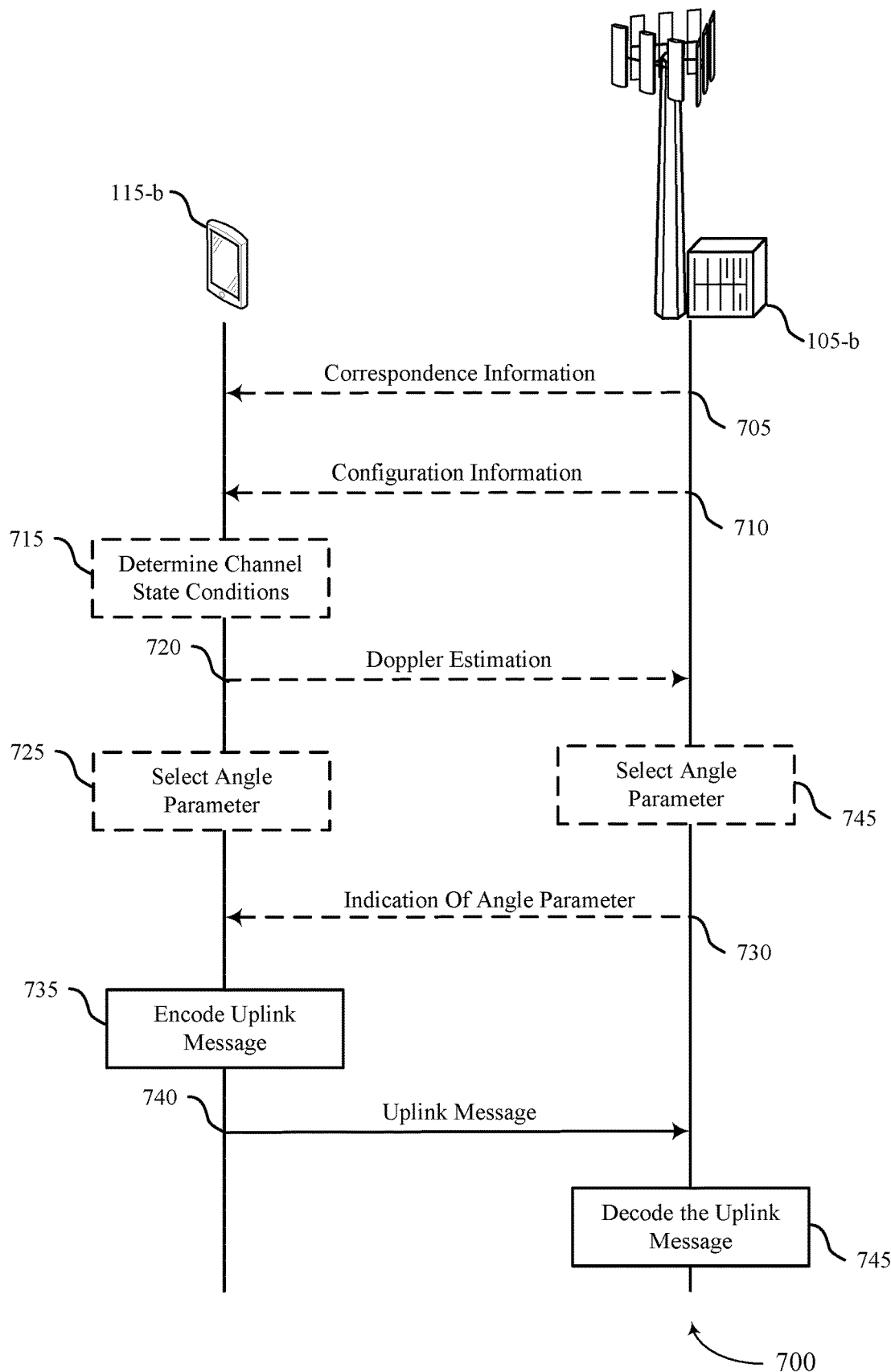
FIG. 7 illustrates an example of a process flow that supports generalization of encoding for uplink transmissions in accordance with aspects of the present disclosure.

FIG. 7 illustrates an example of a process flow 700 that supports generalization of encoding for uplink transmissions in accordance with aspects of the present disclosure. Process flow 700a*y* include a UE 115-*b* and a base station 105-*b*, which may be examples of corresponding deices described with reference to FIGS. 1-6.

UE 115-*b* may encode an uplink transmission using a FrFFT based on an angle parameter. For example, as described in greater detail with reference to FIG. 6, UE 115-*b* may identify an angle parameter (through a variety of methods described herein), and encode an uplink message (e.g., a UCI message on a PUCCH, a data message on a PUSCH, or the like) using the FrFFT based on the angle parameter. UE 115-*b* may encode the uplink message as described with reference to FIGS. 3-5. For example, UE 115-*b* may convert a set of information bits for the uplink message to a decimal value (e.g., a decimal value 1) based on the angle parameter. UE 115-*b* may select a sequence from a pool of sequences (e.g., as described in greater detail with reference to FIGS. 3-4) based at least in part on the angle parameter. UE 115-*b* may then map the selected sequence to one or more resource elements on the uplink channel. At 740, UE 115-*b* may transmit the uplink message to base station 105-*b*. At 745, base station 105-*b* may decode the uplink message using the angle parameter.

In some examples, UE 115-*b* may identify the angle parameter based on a correspondence between beam configurations (e.g., TCI states or QCL relationships) and angle parameters. For example, at 705, base station 105-*b* may transmit, and UE 115-*b* may receive, correspondence information. The correspondence information may include an indication of a correspondence between a set of beam configurations (e.g., a set of TCI states), and a set of angle parameters. In some examples, each angle parameter may be associated with one or more beam configurations. At 710, base station 105-*b* may transmit, and UE 115-*b* may receive, beam configuration information (e.g., a TCI state for use in transmitting uplink message 740). UE 115-*b* may select, at 725, the angle parameter of the set of angle parameters that corresponds to the beam configuration (e.g., TCI state) indicated in the configuration information received at 710. UE 115-*b* may then encode the uplink message at 735 using the angle parameter selected at 725.

In some examples, UE 115-*b* may identify the angle parameter based on a correspondence between QCL configurations and angle parameters. For example, at 705, base station 105-*b* may transmit, and UE 115-*b* may receive, correspondence information. The correspondence information may include an indication of a correspondence between a set of QCL configurations, and a set of angle parameters. In some examples, each angle parameter may be associated with one or more QCL configurations. At 710, base station 105-*b* may transmit, and UE 115-*b* may receive, configuration information (e.g., a QCL configuration for one or more communications). UE 115-*b* may select, at 725, the angle parameter of the set of angle parameters that corresponds to the QCL indicated in the configuration information received at 710. UE 115-*b* may then encode the uplink message at 735 using the angle parameter selected at 725.

In some examples, UE 115-*b* may identify the angle parameter based on a correspondence between channel state conditions and angle parameters. For example, at 705, base station 105-*b* may transmit, and UE 115-*b* may receive, correspondence information. The correspondence information may include an indication of a correspondence between different channel conditions (e.g., different channel condition ranges or channel condition values), and a set of angle parameters. In some examples, each angle parameter may be associated with one or more channel station condition values or ranges of values. At 715, UE 115-*a* may determine current channel conditions (e.g., on the uplink channel on which to transmit the uplink message). UE 115-*b* may select, at 725, the angle parameter of the set of angle parameters that corresponds to the measured channel state conditions (e.g., the range of channel state condition values in which the measured channel state conditions falls). UE 115-*b* may then encode the uplink message at 735 using the angle parameter selected at 725.

In some examples, an angle parameter may be based on Doppler estimations or conditions. For example, UE 115-*b* may be highly mobile, or moving at high speeds, which may result in variations in Doppler values. In some examples, base station 105-*b* may select an angle parameter (or a set of angel parameters) based on current Doppler conditions at UE 115-*b*. For instance, UE 115-*b* may determine a Doppler estimation, which UE 115-*b* may transmit to base station 105-*b* at 720. In some examples, base station 105-*b* may select an angle parameter at 745 based on the received Doppler estimation, and may indicate the selected angle parameter at 730. In such examples, UE 115-*b* may encode the uplink message at 735 using the indicated angle parameter. In some examples, base station 105-*b* may transmit an indication of a set of angle parameters (e.g., instead of a single angle value) based on the Doppler estimation, and UE 115-*b* may select one of the indicated set of angle values.

In some examples, base station 105-*b* may configure UE 115*b* with one or more index values associated with different angle parameters, which may result in more efficiently signaling specific angle parameters or sets of angle parameters for various messages. For example, at 710, base station 105-*b* may transmit (e.g., in a configuration information message), a list of angle parameters, each angle parameter corresponding to an index on a list of index values. In such examples, at 730, base station 105-*b* may transmit an index value indicating the angle parameter. UE 115-*b* may identify the angle parameter that corresponds with the index value based on the received configuration information, and may use the indicated alpha value in encoding the uplink message at 735. In some examples, each index value indicated in the configuration information at 710 may correspond with a list of angle parameters (e.g., a set of four angle parameters for each index value). UE 115-*b* may identify a set of angle parameters indicated by the index value received at 730, and use the set of angle parameters for encoding the uplink message at 735, or may select one of the set of angle parameters for encoding the uplink message at 735.

Figure 8:
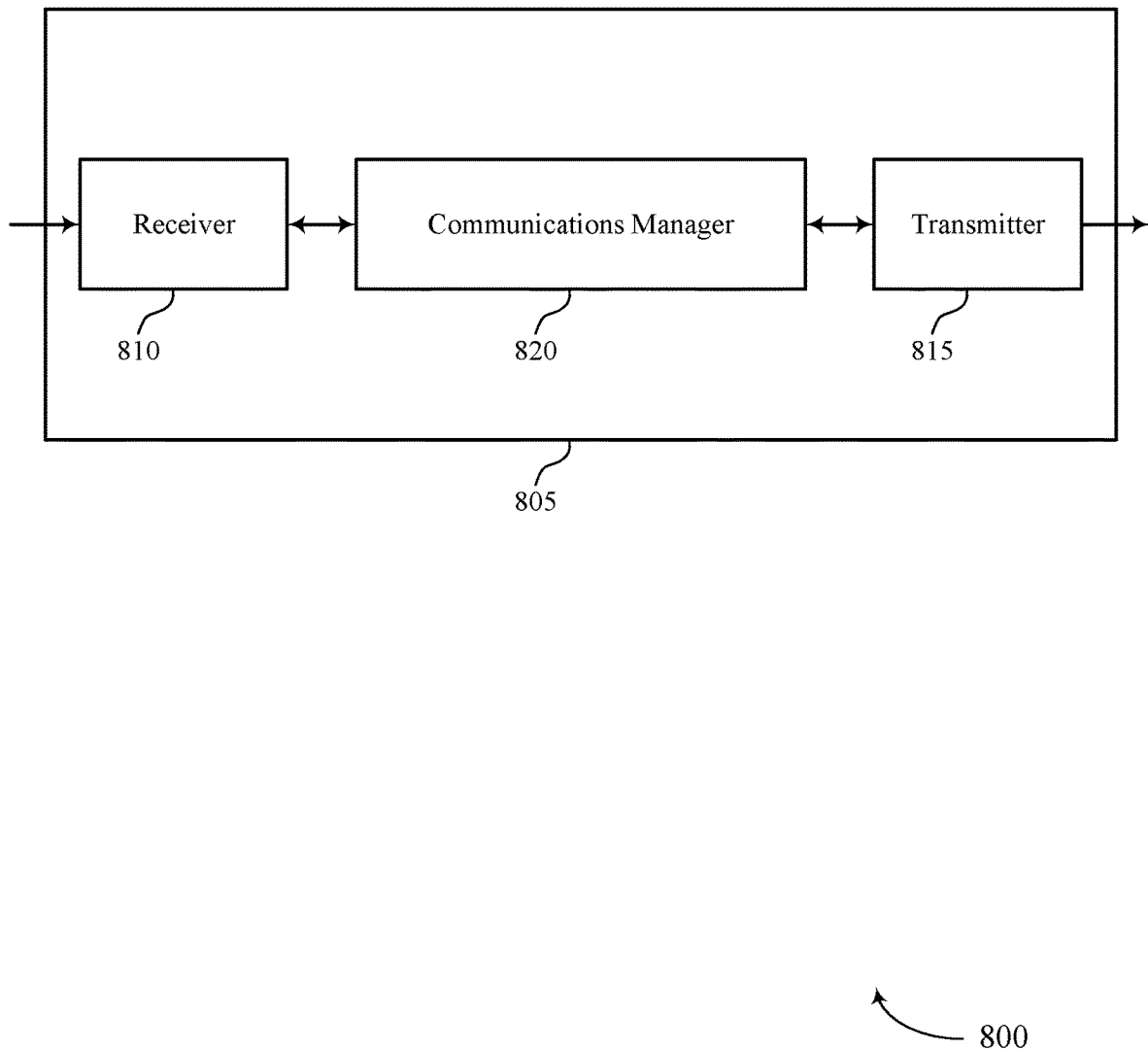
FIGS. 8 and 9 show block diagrams of devices that support generalization of encoding for uplink transmissions in accordance with aspects of the present disclosure.

FIG. 8 shows a block diagram 800 of a device 805 that supports generalization of encoding for uplink transmissions in accordance with aspects of the present disclosure. The device 805 may be an example of aspects of a UE 115 as described herein. The device 805 may include a receiver 810, a transmitter 815, and a communications manager 820. The device 805 may also include one or more processors, memory coupled with the one or more processors, and instructions stored in the memory that are executable by the one or more processors to perform the generalized encoding features described herein. Each of these components may be in communication with one another (e.g., via one or more buses).

The receiver 810 may provide a means for receiving information such as packets, user data, control information, or any combination thereof associated with various information channels (e.g., control channels, data channels, information channels related to generalization of encoding for uplink transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to generalization of encoding for uplink transmissions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of generalization of encoding for uplink transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, an indication of a first set of angle parameters for the UE to use for an inverse fractional Fourier transform. The communications manager 820 may be configured as or otherwise support a means for encoding an uplink message using the inverse fractional Fourier transform according to an angle parameter of the first set of angle parameters. The communications manager 820 may be configured as or otherwise support a means for transmitting, to the base station on an uplink channel, the uplink message that is encoded using the fractional Fourier transform according to the indicated angle parameter.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for encoding uplink signaling, resulting in increased payload size, improved reliability of uplink signaling (e.g., in high Doppler scenarios), more efficient use of computational resources, and improved user experience. Additionally, such techniques may result in decreased interference and improved reception at receiving devices.

Figure 9:
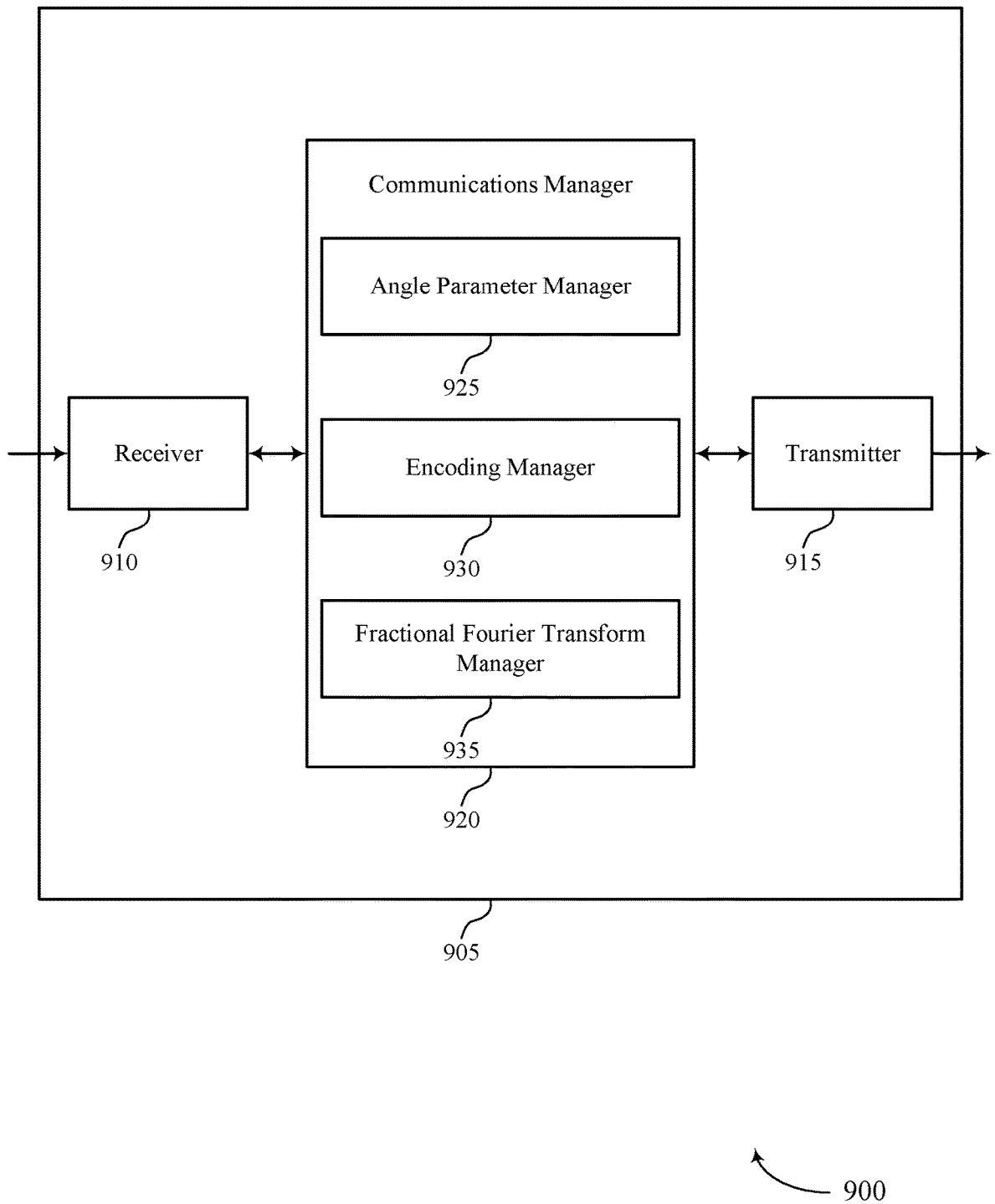

FIG. 9 shows a block diagram 900 of a device 905 that supports generalization of encoding for uplink transmissions in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to generalization of encoding for uplink transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to generalization of encoding for uplink transmissions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of generalization of encoding for uplink transmissions as described herein. For example, the communications manager 920 may include an angle parameter manager 925, an encoding manager 930, a fractional Fourier Transform manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The angle parameter manager 925 may be configured as or otherwise support a means for receiving, from a base station, an indication of a first set of angle parameters for the UE to use for an inverse fractional Fourier transform. The encoding manager 930 may be configured as or otherwise support a means for encoding an uplink message using the inverse fractional Fourier transform according to an angle parameter of the first set of angle parameters. The fractional Fourier Transform manager 935 may be configured as or otherwise support a means for transmitting, to the base station on an uplink channel, the uplink message that is encoded using the fractional Fourier transform according to the indicated angle parameter.

In some cases, the angle parameter manager 925, the encoding manager 930, and the Fractional Fourier Transform Manager 935, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the angle parameter manager 925, the encoding manager 930, and the Fractional Fourier Transform Manager 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
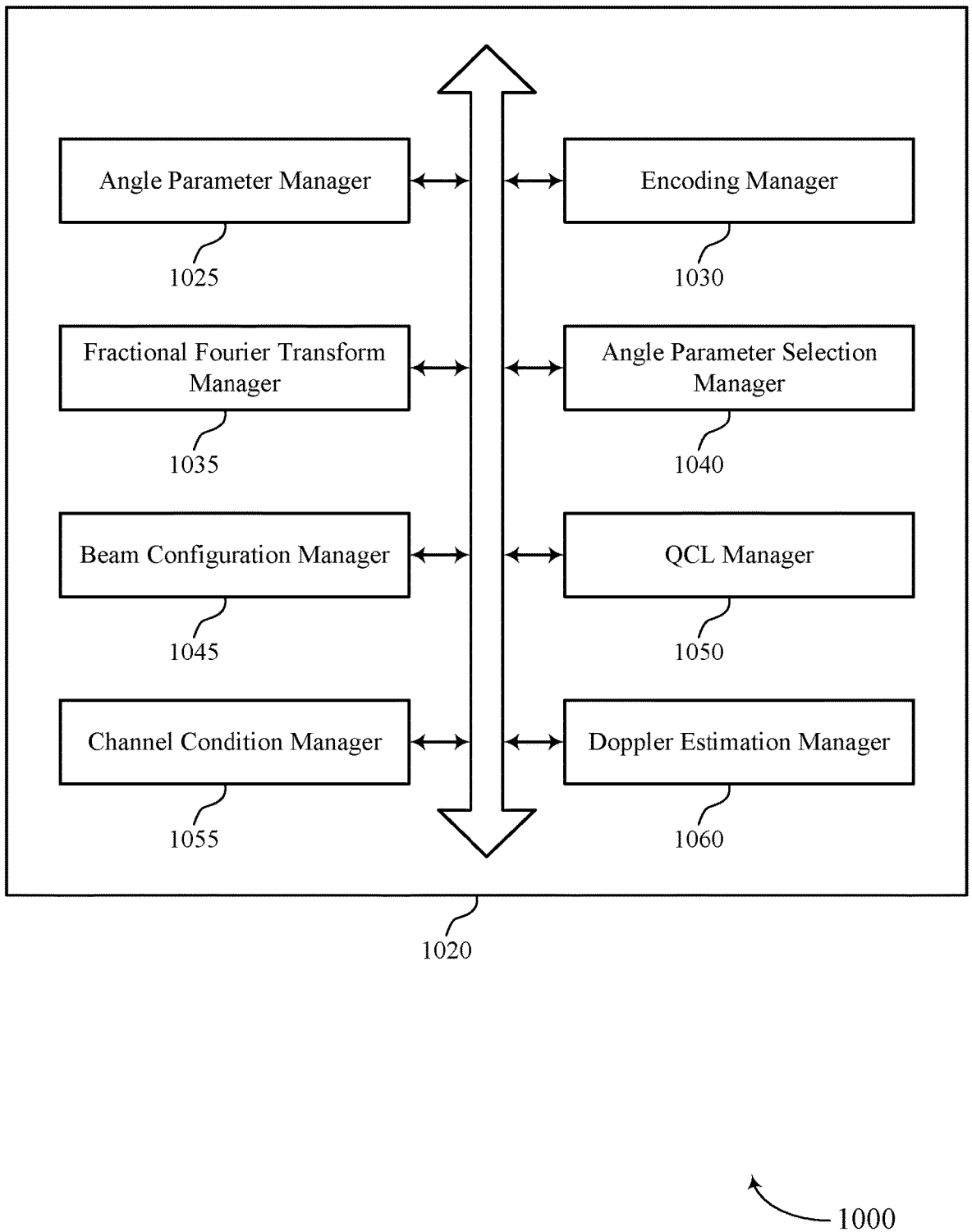
FIG. 10 shows a block diagram of a communications manager that supports generalization of encoding for uplink transmissions in accordance with aspects of the present disclosure.

FIG. 10 shows a block diagram 1000 of a communications manager 1020 that supports generalization of encoding for uplink transmissions in accordance with aspects of the present disclosure. The communications manager 1020 may be an example of aspects of a communications manager 820, a communications manager 920, or both, as described herein. The communications manager 1020, or various components thereof, may be an example of means for performing various aspects of generalization of encoding for uplink transmissions as described herein. For example, the communications manager 1020 may include an angle parameter manager 1025, an encoding manager 1030, a fractional Fourier Transform manager 1035, an angle parameter selection manager 1040, a beam configuration manager 1045, a QCL manager 1050, a channel condition manager 1055, a Doppler estimation manager 1060, or any combination thereof. Each of these components may communicate, directly or indirectly, with one another (e.g., via one or more buses).

The communications manager 1020 may support wireless communications at a UE in accordance with examples as disclosed herein. The angle parameter manager 1025 may be configured as or otherwise support a means for receiving, from a base station, an indication of a first set of angle parameters for the UE to use for an inverse fractional Fourier transform. The encoding manager 1030 may be configured as or otherwise support a means for encoding an uplink message using the inverse fractional Fourier transform according to an angle parameter of the first set of angle parameters. The fractional Fourier Transform manager 1035 may be configured as or otherwise support a means for transmitting, to the base station on an uplink channel, the uplink message that is encoded using the fractional Fourier transform according to the indicated angle parameter.

In some examples, the angle parameter manager 1025 may be configured as or otherwise support a means for receiving, from the base station, an indication of the angle parameter of the first set of angle parameters for the UE to use for the inverse fractional Fourier transform.

In some examples, the angle parameter selection manager 1040 may be configured as or otherwise support a means for selecting, by the UE, a second set of angle parameters including the angle parameter. In some examples, the angle parameter selection manager 1040 may be configured as or otherwise support a means for transmitting, to the base station, an indication of the selected second set of angle parameters, where receiving the indication of the first set of angle parameters is responsive at least in part to the first set of angle parameters.

In some examples, the angle parameter manager 1025 may be configured as or otherwise support a means for transmitting, to the base station, an indication of a second set of angle parameters including the angle parameter, where the indication of the first set of angle parameters is received at least in part in response to the transmitted indication of the second set of angle parameters. In some examples, the angle parameter selection manager 1040 may be configured as or otherwise support a means for selecting, from the first set of angle parameters, a set of multiple angle parameters including the angle parameter. In some examples, the angle parameter selection manager 1040 may be configured as or otherwise support a means for transmitting, to the base station, an indication of the selection. In some examples, the angle parameter selection manager 1040 may be configured as or otherwise support a means for receiving an indication of the angle parameter at least in part in response to the transmitted indication of the selection.

In some examples, to support receiving the indication of the first set of angle parameters, the beam configuration manager 1045 may be configured as or otherwise support a means for receiving a configuration indicating a correspondence between a set of beam configurations and the first set of angle parameters.

In some examples, the beam configuration manager 1045 may be configured as or otherwise support a means for receiving, from the base station, an indication of a beam configuration associated with the uplink message. In some examples, the beam configuration manager 1045 may be configured as or otherwise support a means for selecting the angle parameter from the first set of angle parameters based on receiving the indication of the beam configuration and the correspondence, where encoding the uplink message is based on the selecting.

In some examples, to support receiving the indication of the first set of angle parameters, the QCL manager 1050 may be configured as or otherwise support a means for receiving a configuration indicating a correspondence between a set of quasi co-location configurations and the first set of angle parameters.

In some examples, the QCL manager 1050 may be configured as or otherwise support a means for receiving, from the base station, an indication of a quasi co-location configuration associated with the uplink channel. In some examples, the QCL manager 1050 may be configured as or otherwise support a means for selecting the angle parameter from the first set of angle parameters based on receiving the indication of the quasi co-location configuration and the correspondence, where encoding the uplink message is based on the selecting.

In some examples, to support receiving the indication of the first set of angle parameters, the channel condition manager 1055 may be configured as or otherwise support a means for receiving a configuration indicating a correspondence between a set of channel conditions and the first set of angle parameters.

In some examples, the channel condition manager 1055 may be configured as or otherwise support a means for determining channel state conditions at the UE. In some examples, the channel condition manager 1055 may be configured as or otherwise support a means for selecting the angle parameter from the first set of angle parameters based on determining the channel state conditions and the correspondence, where encoding the uplink message is based on the selecting.

In some examples, the Doppler estimation manager 1060 may be configured as or otherwise support a means for transmitting, to the base station, an indication of a Doppler estimate, where the indication of the first set of angle parameters is received at least in part in response to the transmitted indication of the Doppler estimate.

In some examples, the angle parameter manager 1025 may be configured as or otherwise support a means for receiving an index value corresponding to the angle parameter, where receiving the indication of the first set of angle parameters includes receiving a list of angle parameters, each angle parameter corresponding to one index of the list.

In some examples, to support receiving the indication of the first set of angle parameters, the angle parameter manager 1025 may be configured as or otherwise support a means for receiving a radio resource control message, a MAC control element (CE), a downlink control information message, or any combination thereof, including the indication of the first set of angle parameters.

In some examples, to support encoding the uplink message, the encoding manager 1030 may be configured as or otherwise support a means for converting a set of information bits associated with the uplink message to a decimal value based on the angle parameter. In some examples, to support encoding the uplink message, the encoding manager 1030 may be configured as or otherwise support a means for selecting a sequence from a pool of sequences based on the decimal value and the angle parameter. In some examples, to support encoding the uplink message, the encoding manager 1030 may be configured as or otherwise support a means for mapping the selected sequence to one or more resource elements on the uplink channel. In some examples, the uplink message on the uplink channel includes an UCI message on an uplink control channel. In some examples, the transmitted uplink message lacks an associated demodulation reference signal.

In some cases, the angle parameter manager 1025, the Fractional Fourier Transform manager 1035, the beam configuration manager 1045, the channel condition manager 1055, the encoding manager 1030, the angle parameter selection manager 1040, the QCL manager 1050, and the Doppler estimation manager 1060 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the angle parameter manager 1025, the Fractional Fourier Transform manager 1035, the beam configuration manager 1045, the channel condition manager 1055, the encoding manager 1030, the angle parameter selection manager 1040, the QCL manager 1050, and the Doppler estimation manager 1060 may each be or be at least a part of a processor (e.g., a transceiver processor, or a radio discussed herein.

Figure 11:
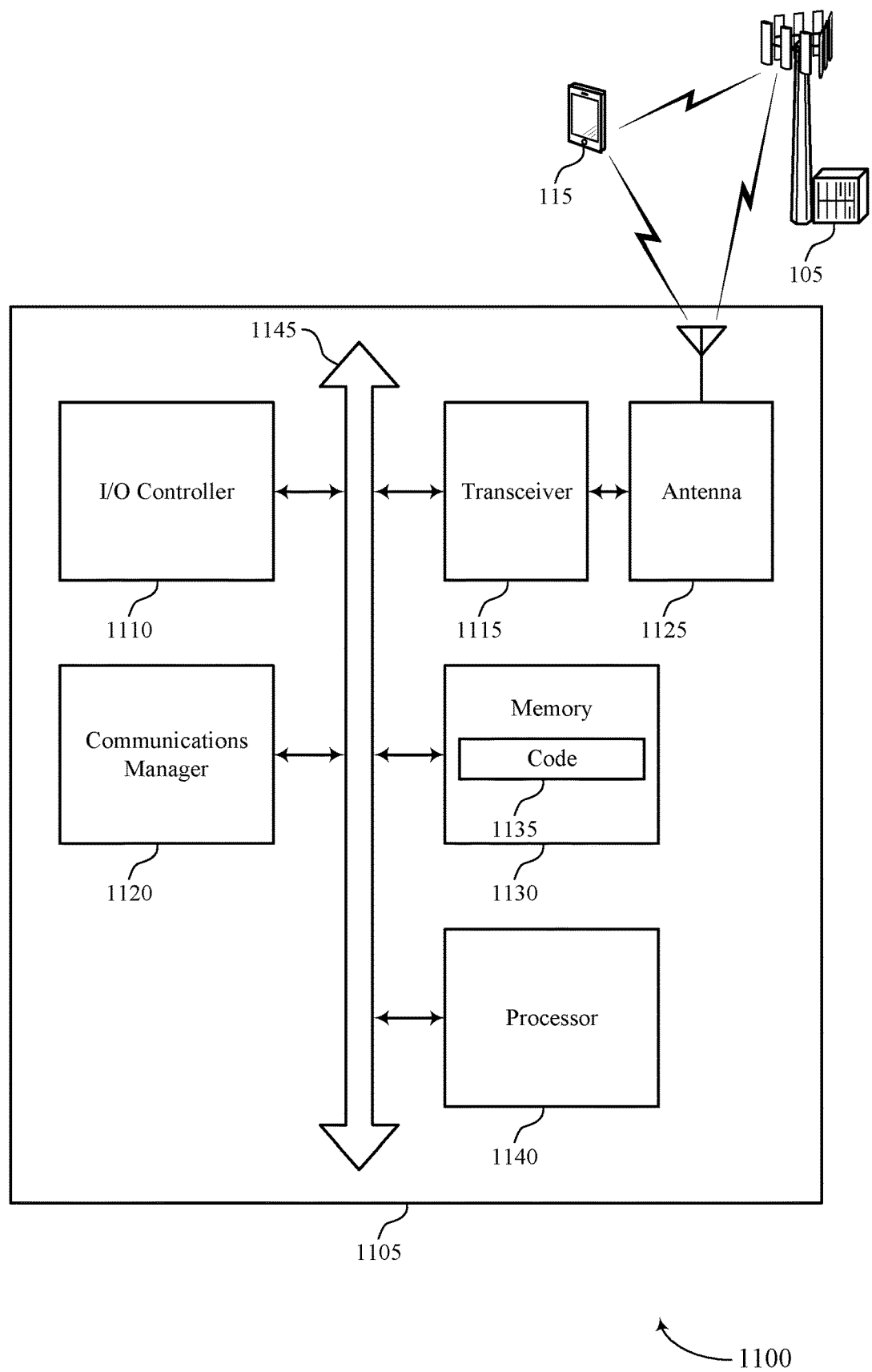
FIG. 11 shows a diagram of a system including a device that supports generalization of encoding for uplink transmissions in accordance with aspects of the present disclosure.

FIG. 11 shows a diagram of a system 1100 including a device 1105 that supports generalization of encoding for uplink transmissions in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting generalization of encoding for uplink transmissions). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, an indication of a first set of angle parameters for the UE to use for an inverse fractional Fourier transform. The communications manager 1120 may be configured as or otherwise support a means for encoding an uplink message using the inverse fractional Fourier transform according to an angle parameter of the first set of angle parameters. The communications manager 1120 may be configured as or otherwise support a means for transmitting, to the base station on an uplink channel, the uplink message that is encoded using the fractional Fourier transform according to the indicated angle parameter.

By including or configuring the communications manager 1120 in accordance with examples as described herein, the device 1105 may support techniques for encoding uplink signaling, resulting in increased payload size, improved reliability of uplink signaling (e.g., in high Doppler scenarios), more efficient use of computational resources, and improved user experience. Additionally, such techniques may result in decreased interference and improved reception at receiving devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of generalization of encoding for uplink transmissions as described herein, or the processor 1140 and the memory 1130 may be otherwise configured to perform or support such operations.

Figure 12:
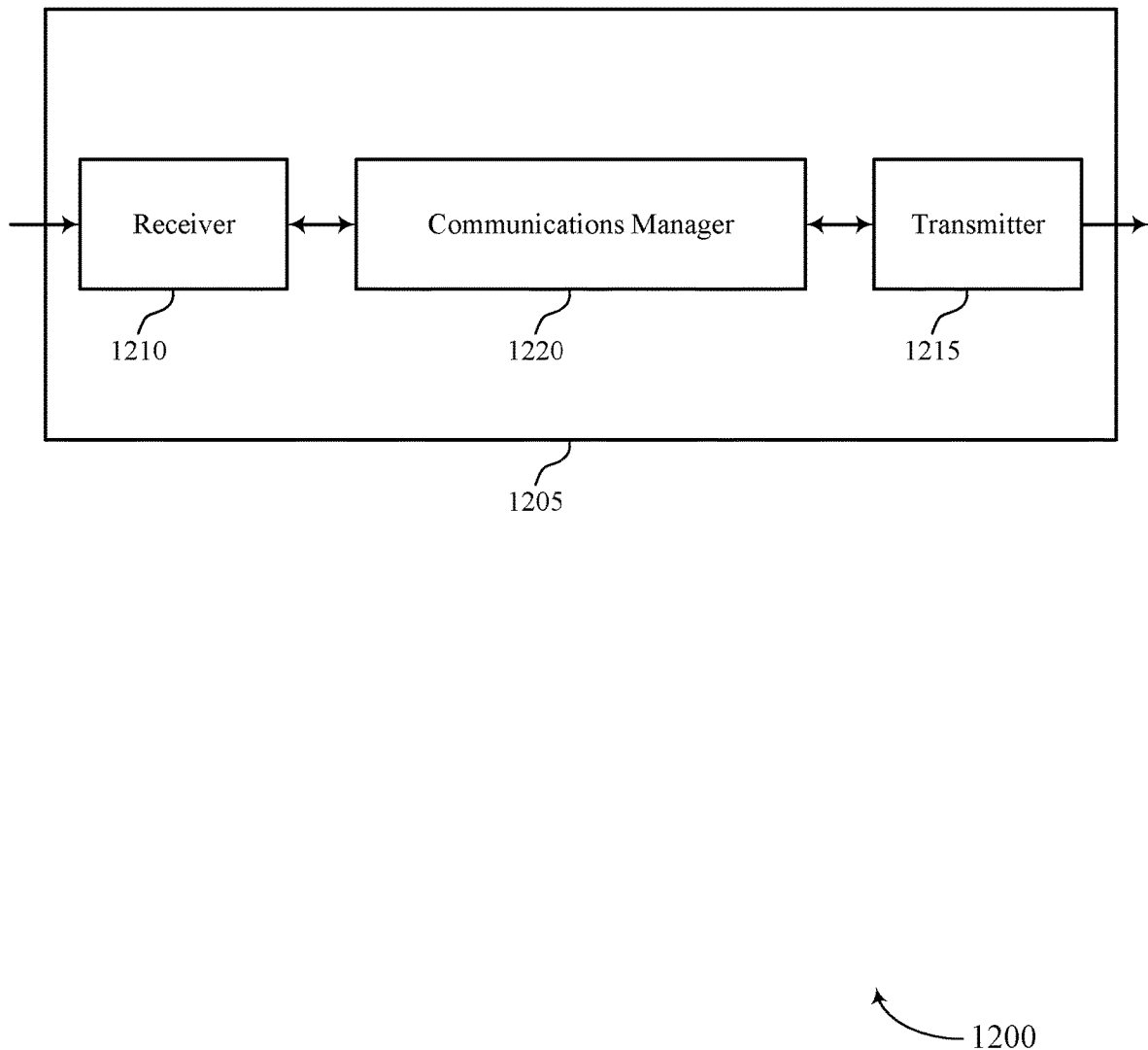
FIGS. 12 and 13 show block diagrams of devices that support generalization of encoding for uplink transmissions in accordance with aspects of the present disclosure.

FIG. 12 shows a block diagram 1200 of a device 1205 that supports generalization of encoding for uplink transmissions in accordance with aspects of the present disclosure. The device 1205 may be an example of aspects of a base station 105 as described herein. The device 1205 may include a receiver 1210, a transmitter 1215, and a communications manager 1220. The device 1205 may also include one or more processors, memory coupled with one or more processors, and instructions stored in the memory that are executable by the one or more processors to enable the one or more processors to perform the generalized encoding features discussed herein. Each of these components may be in communication with one another (e.g., via one or more buses).

The receiver 1210 may provide a means for receiving information such as packets, user data, control information, or any combination thereof associated with various information channels (e.g., control channels, data channels, information channels related to generalization of encoding for uplink transmissions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to generalization of encoding for uplink transmissions). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of generalization of encoding for uplink transmissions as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, an indication of a first set of angle parameters for the UE to use to encode uplink messages using an inverse fractional Fourier transform. The communications manager 1220 may be configured as or otherwise support a means for receiving an uplink message from the UE on an uplink channel. The communications manager 1220 may be configured as or otherwise support a means for decoding the uplink message using a fractional Fourier transform according to an angle parameter of the first set of angle parameters.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for decoding uplink signaling, resulting in increased payload size, improved reliability of uplink signaling (e.g., in high Doppler scenarios), more efficient use of computational resources, and improved user experience. Additionally, such techniques may result in decreased interference and improved reception at receiving devices.

Figure 13:
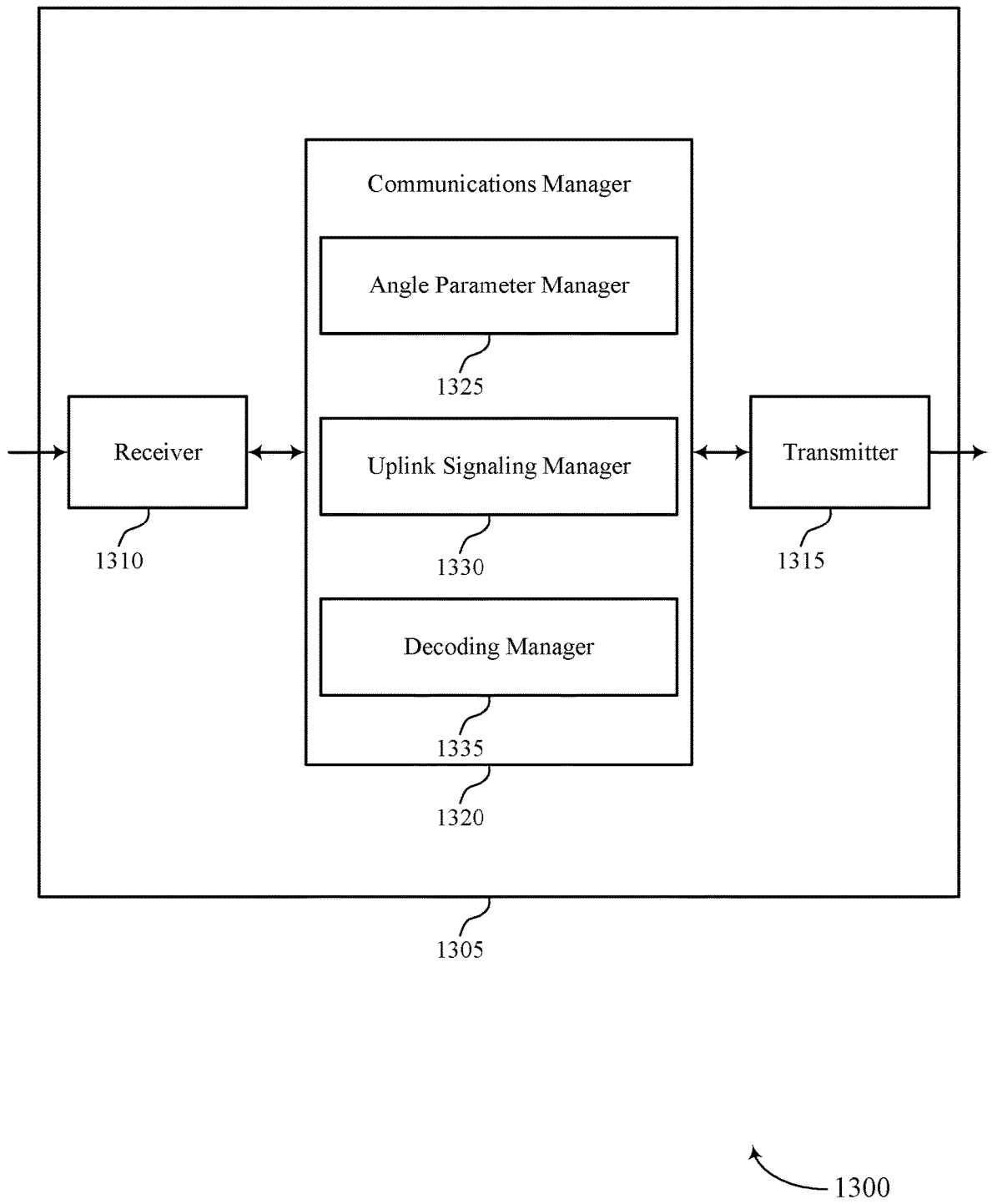

FIG. 13 shows a block diagram 1300 of a device 1305 that supports generalization of encoding for uplink transmissions in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to generalization of encoding for uplink transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to generalization of encoding for uplink transmissions). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of generalization of encoding for uplink transmissions as described herein. For example, the communications manager 1320 may include an angle parameter manager 1325, an uplink signaling manager 1330, a decoding manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The angle parameter manager 1325 may be configured as or otherwise support a means for transmitting, to a UE, an indication of a first set of angle parameters for the UE to use to encode uplink messages using an inverse fractional Fourier transform. The uplink signaling manager 1330 may be configured as or otherwise support a means for receiving an uplink message from the UE on an uplink channel. The decoding manager 1335 may be configured as or otherwise support a means for decoding the uplink message using a fractional Fourier transform according to an angle parameter of the first set of angle parameters.

In some cases, the angle parameter manager 1325, the uplink signaling manager 1330, and the decoding manager 1335 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the angle parameter manager 1325, the uplink signaling manager 1330, and the decoding manager 1335 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
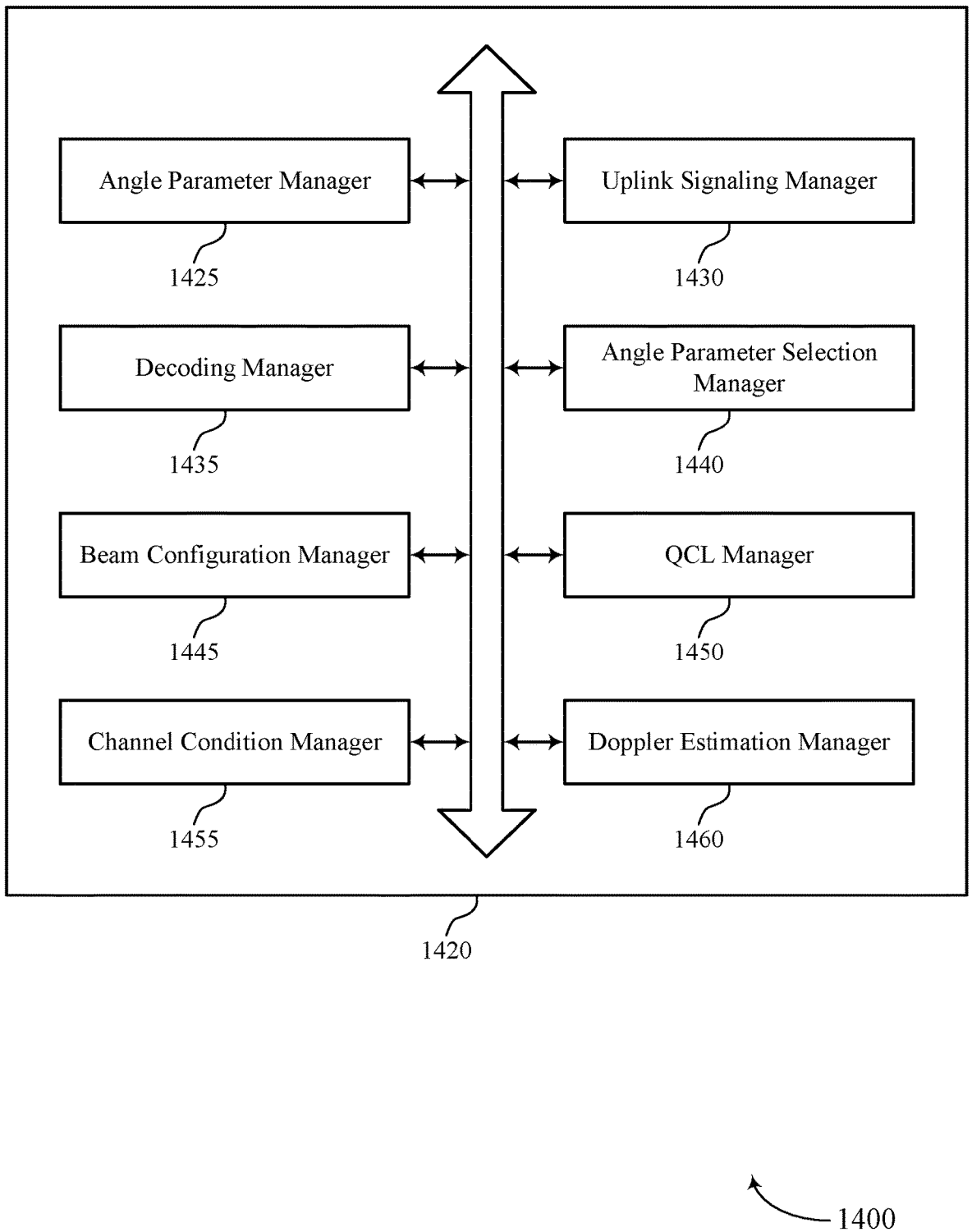
FIG. 14 shows a block diagram of a communications manager that supports generalization of encoding for uplink transmissions in accordance with aspects of the present disclosure.

FIG. 14 shows a block diagram 1400 of a communications manager 1420 that supports generalization of encoding for uplink transmissions in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of generalization of encoding for uplink transmissions as described herein. For example, the communications manager 1420 may include an angle parameter manager 1425, an uplink signaling manager 1430, a decoding manager 1435, an angle parameter selection manager 1440, a beam configuration manager 1445, a QCL manager 1450, a channel condition manager 1455, a Doppler estimation manager 1460, or any combination thereof. Each of these components may communicate, directly or indirectly, with one another (e.g., via one or more buses).

The communications manager 1420 may support wireless communications at a base station in accordance with examples as disclosed herein. The angle parameter manager 1425 may be configured as or otherwise support a means for transmitting, to a UE, an indication of a first set of angle parameters for the UE to use to encode uplink messages using an inverse fractional Fourier transform. The uplink signaling manager 1430 may be configured as or otherwise support a means for receiving an uplink message from the UE on an uplink channel. The decoding manager 1435 may be configured as or otherwise support a means for decoding the uplink message using a fractional Fourier transform according to an angle parameter of the first set of angle parameters.

In some examples, the angle parameter manager 1425 may be configured as or otherwise support a means for receiving, from the UE, an indication of a second set of angle parameters including the angle parameter. In some examples, the angle parameter selection manager 1440 may be configured as or otherwise support a means for selecting the first set of angle parameters based on the first set of angle parameters from the UE.

In some examples, to support transmitting the indication of the first set of angle parameters, the beam configuration manager 1445 may be configured as or otherwise support a means for transmitting a configuration indicating a correspondence between a set of beam configurations and the first set of angle parameters.

In some examples, to support transmitting the indication of the first set of angle parameters, the QCL manager 1450 may be configured as or otherwise support a means for transmitting a configuration indicating a correspondence between a set of quasi co-location configurations and the first set of angle parameters.

In some examples, to support transmitting the indication of the first set of angle parameters, the channel condition manager 1455 may be configured as or otherwise support a means for transmitting a configuration indicating a correspondence between a set of channel conditions and individual ones of a set of angle parameters.

In some examples, the Doppler estimation manager 1460 may be configured as or otherwise support a means for receiving, from the UE, an indication of a Doppler estimate, where the indication of the first set of angle parameters is transmitted based on receiving the indication of the Doppler estimate.

In some cases, the angle parameter manager 1425, the uplink signaling manager 1430, the decoding manager 1435, the angle parameter selection manager 1440, beam configuration manager 1445, the QCL manager 1450, the channel condition manager 1455, and the Doppler estimation manager 1460 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the angle parameter manager 1425, the uplink signaling manager 1430, the decoding manager 1435, the angle parameter selection manager 1440, beam configuration manager 1445, the QCL manager 1450, the channel condition manager 1455, and the Doppler estimation manager 1460 discussed herein.

Figure 15:
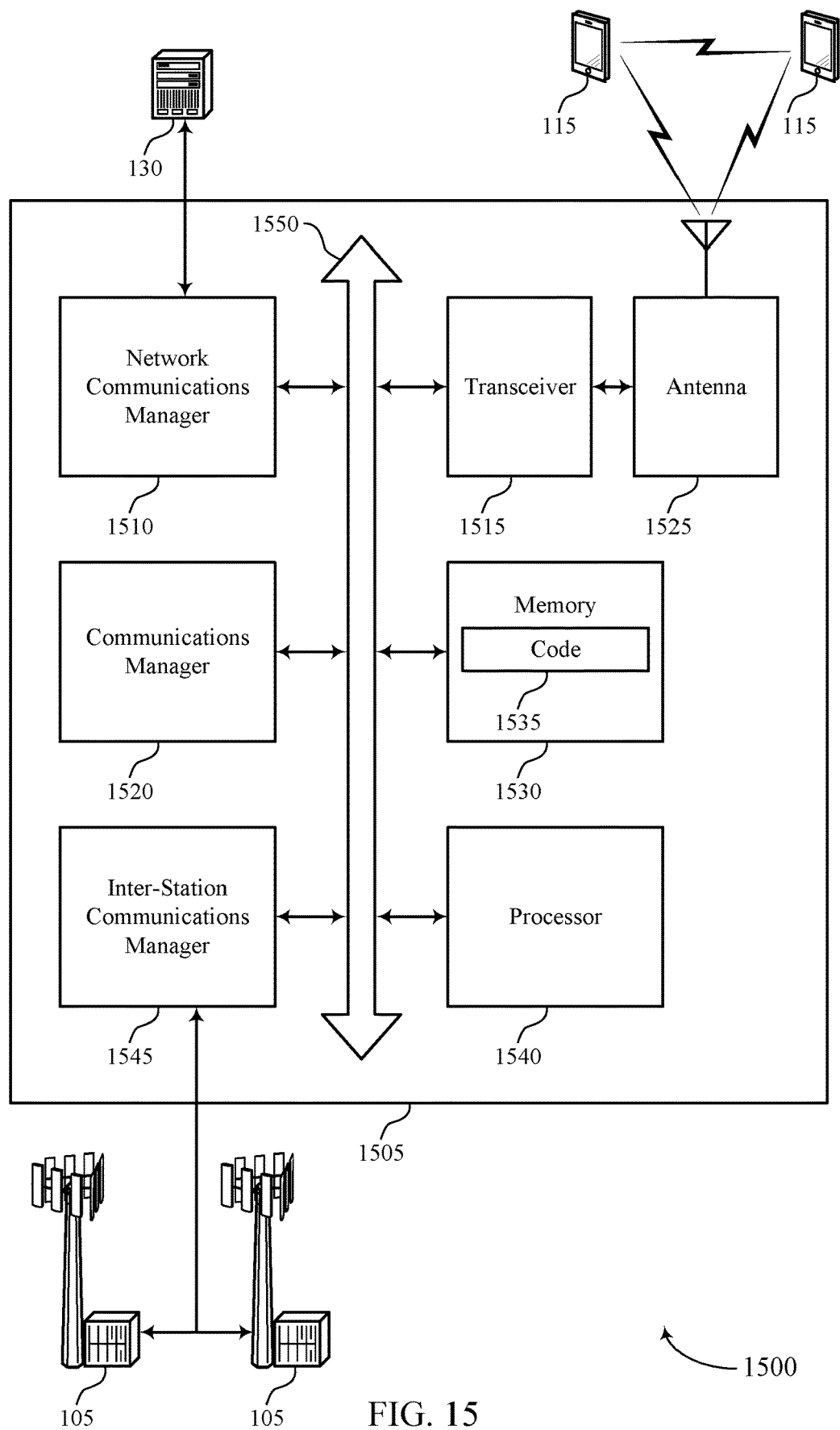
FIG. 15 shows a diagram of a system including a device that supports generalization of encoding for uplink transmissions in accordance with aspects of the present disclosure.

FIG. 15 shows a diagram of a system 1500 including a device 1505 that supports generalization of encoding for uplink transmissions in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting generalization of encoding for uplink transmissions). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, an indication of a first set of angle parameters for the UE to use to encode uplink messages using an inverse fractional Fourier transform. The communications manager 1520 may be configured as or otherwise support a means for receiving an uplink message from the UE on an uplink channel. The communications manager 1520 may be configured as or otherwise support a means for decoding the uplink message using a fractional Fourier transform according to an angle parameter of the first set of angle parameters.

By including or configuring the communications manager 1520 in accordance with examples as described herein, the device 1505 may support techniques for decoding uplink signaling, resulting in increased payload size, improved reliability of uplink signaling (e.g., in high Doppler scenarios), more efficient use of computational resources, and improved user experience. Additionally, such techniques may result in decreased interference and improved reception at receiving devices.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of generalization of encoding for uplink transmissions as described herein, or the processor 1540 and the memory 1530 may be otherwise configured to perform or support such operations.

Figure 16:
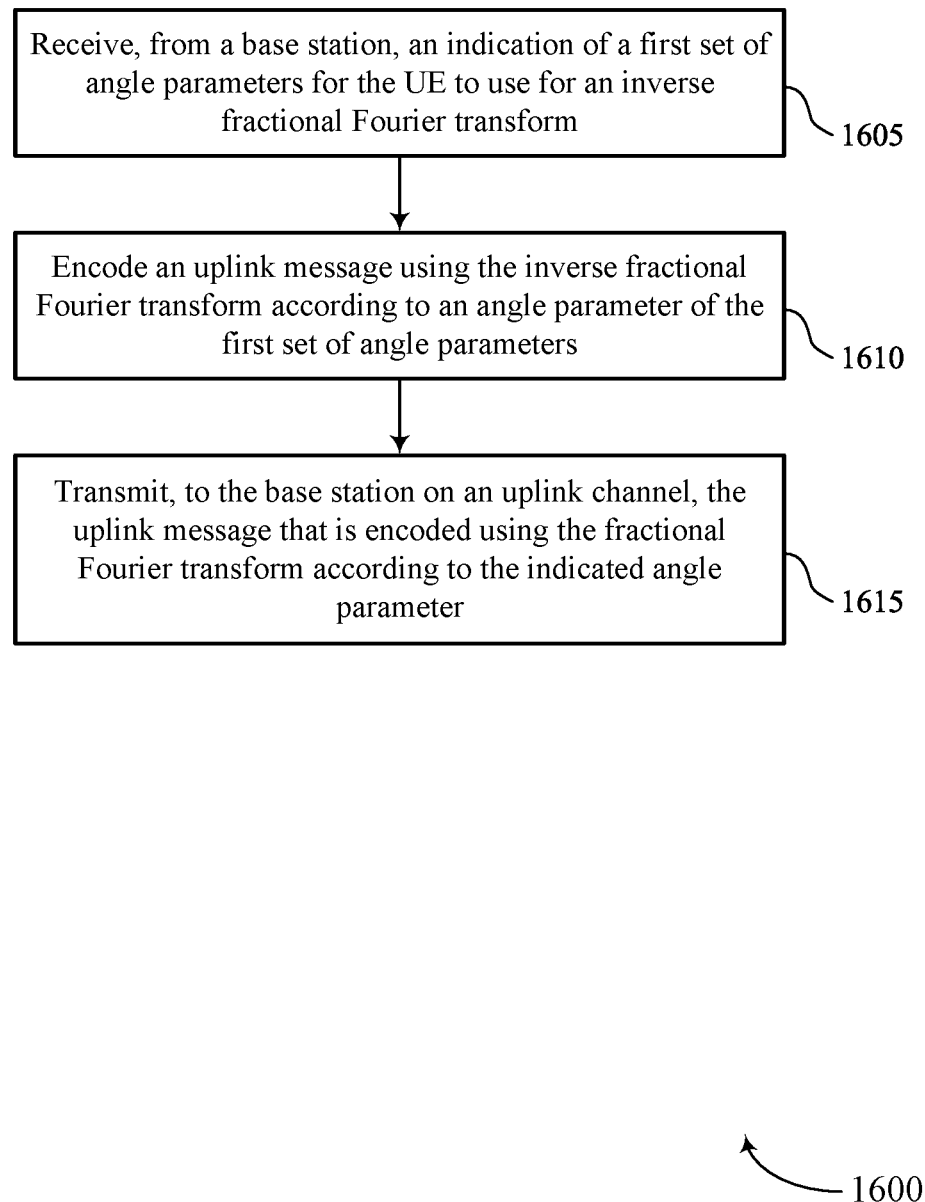
FIGS. 16 through 20 show flowcharts illustrating methods that support generalization of encoding for uplink transmissions in accordance with aspects of the present disclosure.

FIG. 16 shows a flowchart illustrating a method 1600 that supports generalization of encoding for uplink transmissions in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, an indication of a first set of angle parameters for the UE to use for an inverse fractional Fourier transform. The operations of 1605 may be performed in accordance with examples as disclosed herein. In some examples, aspects of the operations of 1605 may be performed by an angle parameter manager 1025 as described with reference to FIG. 10.

At 1610, the method may include encoding an uplink message using the inverse fractional Fourier transform according to an angle parameter of the first set of angle parameters. The operations of 1610 may be performed in accordance with examples as disclosed herein. In some examples, aspects of the operations of 1610 may be performed by an encoding manager 1030 as described with reference to FIG. 10.

At 1615, the method may include transmitting, to the base station on an uplink channel, the uplink message that is encoded using the fractional Fourier transform according to the indicated angle parameter. The operations of 1615 may be performed in accordance with examples as disclosed herein. In some examples, aspects of the operations of 1615 may be performed by a fractional Fourier Transform manager 1035 as described with reference to FIG. 10.

Figure 17:
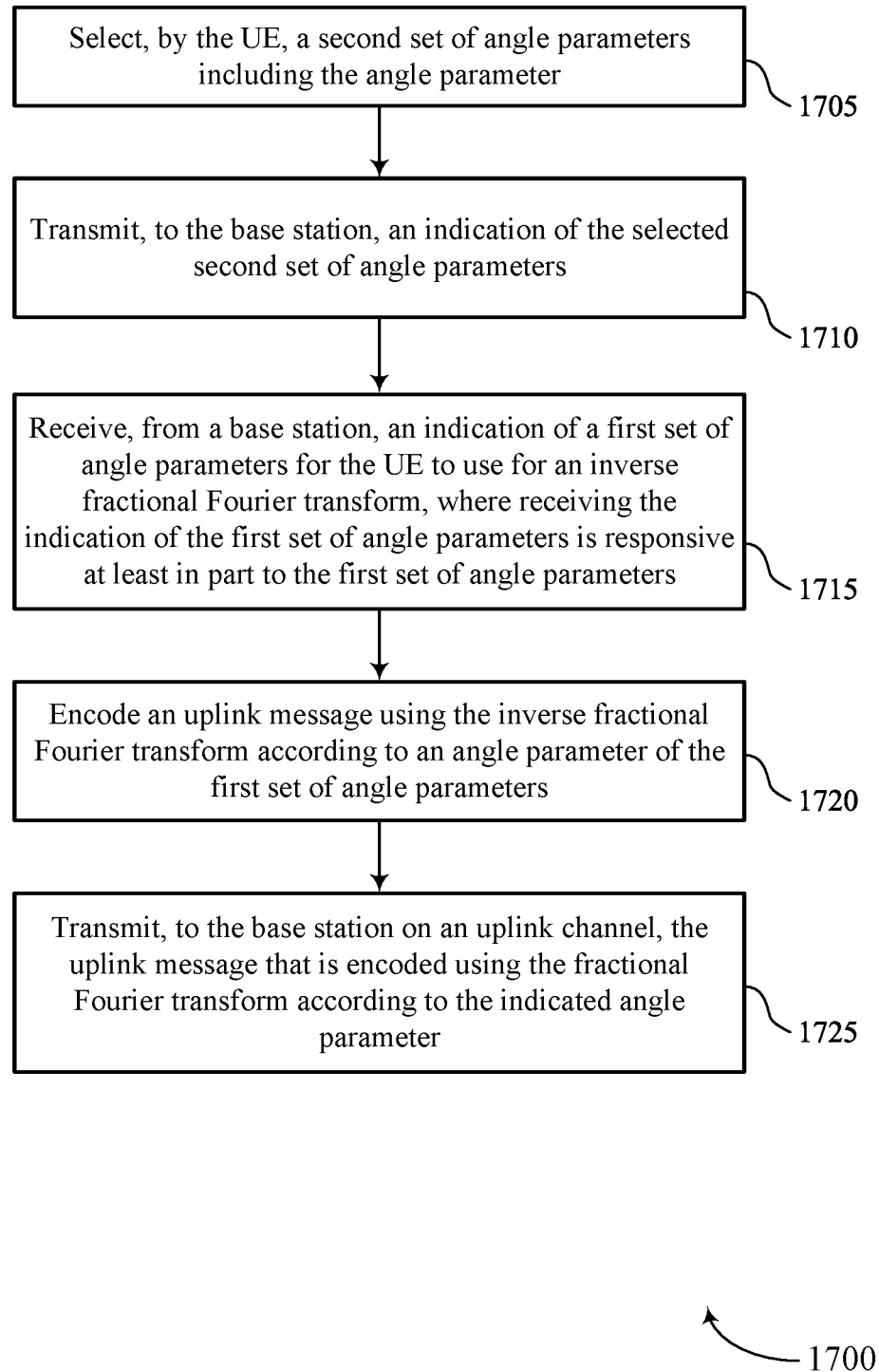

FIG. 17 shows a flowchart illustrating a method 1700 that supports generalization of encoding for uplink transmissions in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include selecting, by the UE, a second set of angle parameters including an angle parameter. The operations of 1705 may be performed in accordance with examples as disclosed herein. In some examples, aspects of the operations of 1705 may be performed by an angle parameter selection manager 1040 as described with reference to FIG. 10.

At 1710, the method may include transmitting, to the base station, an indication of the selected second set of angle parameters. The operations of 1710 may be performed in accordance with examples as disclosed herein. In some examples, aspects of the operations of 1710 may be performed by an angle parameter selection manager 1040 as described with reference to FIG. 10.

At 1715, the method may include receiving, from a base station, an indication of a first set of angle parameters for the UE to use for an inverse fractional Fourier transform, where receiving the indication of the first set of angle parameters is responsive at least in part to the first set of angle parameters. The operations of 1715 may be performed in accordance with examples as disclosed herein. In some examples, aspects of the operations of 1715 may be performed by an angle parameter manager 1025 as described with reference to FIG. 10.

At 1720, the method may include encoding an uplink message using the inverse fractional Fourier transform according to an angle parameter of the first set of angle parameters. The operations of 1720 may be performed in accordance with examples as disclosed herein. In some examples, aspects of the operations of 1720 may be performed by an encoding manager 1030 as described with reference to FIG. 10.

At 1725, the method may include transmitting, to the base station on an uplink channel, the uplink message that is encoded using the fractional Fourier transform according to the indicated angle parameter. The operations of 1725 may be performed in accordance with examples as disclosed herein. In some examples, aspects of the operations of 1725 may be performed by a fractional Fourier Transform manager 1035 as described with reference to FIG. 10.

Figure 18:
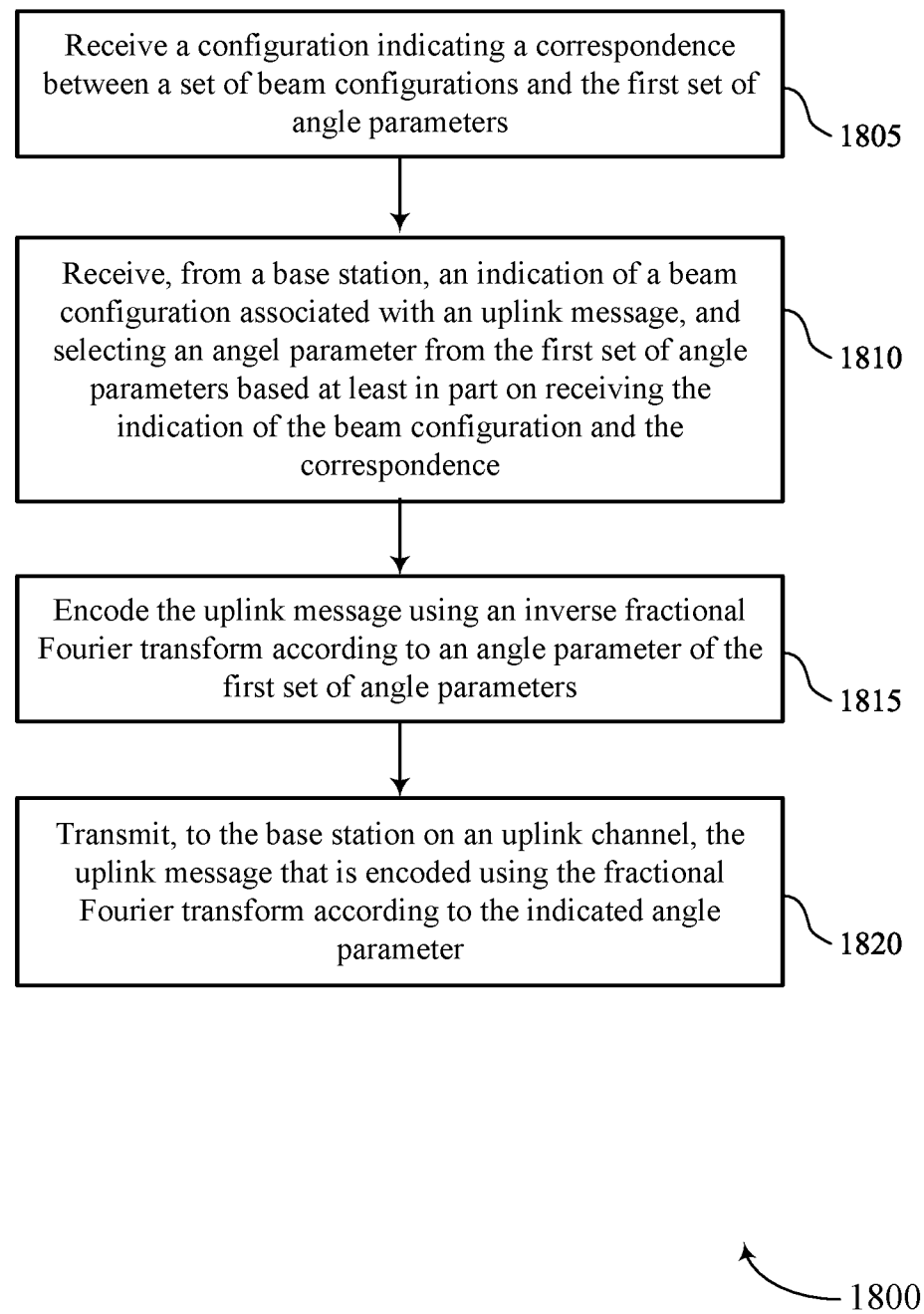

FIG. 18 shows a flowchart illustrating a method 1800 that supports generalization of encoding for uplink transmissions in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a configuration indicating a correspondence between a set of beam configurations and the first set of angle parameters. The operations of 1805 may be performed in accordance with examples as disclosed herein. In some examples, aspects of the operations of 1805 may be performed by a beam configuration manager 1045 as described with reference to FIG. 10.

At 1810, the method may include receiving, from a base station, an indication of a beam configuration associated with an uplink message, and selecting an angle parameter from the first set of angle parameters based at least in part on receiving the indication of the beam configuration and the correspondence. The operations of 1810 may be performed in accordance with examples as disclosed herein. In some examples, aspects of the operations of 1810 may be performed by an angle parameter manager 1025 as described with reference to FIG. 10.

At 1815, the method may include encoding the uplink message using an inverse fractional Fourier transform according to the angle parameter of the first set of angle parameters. The operations of 1815 may be performed in accordance with examples as disclosed herein. In some examples, aspects of the operations of 1815 may be performed by an encoding manager 1030 as described with reference to FIG. 10.

At 1820, the method may include transmitting, to the base station on an uplink channel, the uplink message that is encoded using the fractional Fourier transform according to the indicated angle parameter. The operations of 1820 may be performed in accordance with examples as disclosed herein. In some examples, aspects of the operations of 1820 may be performed by a fractional Fourier Transform manager 1035 as described with reference to FIG. 10.

Figure 19:
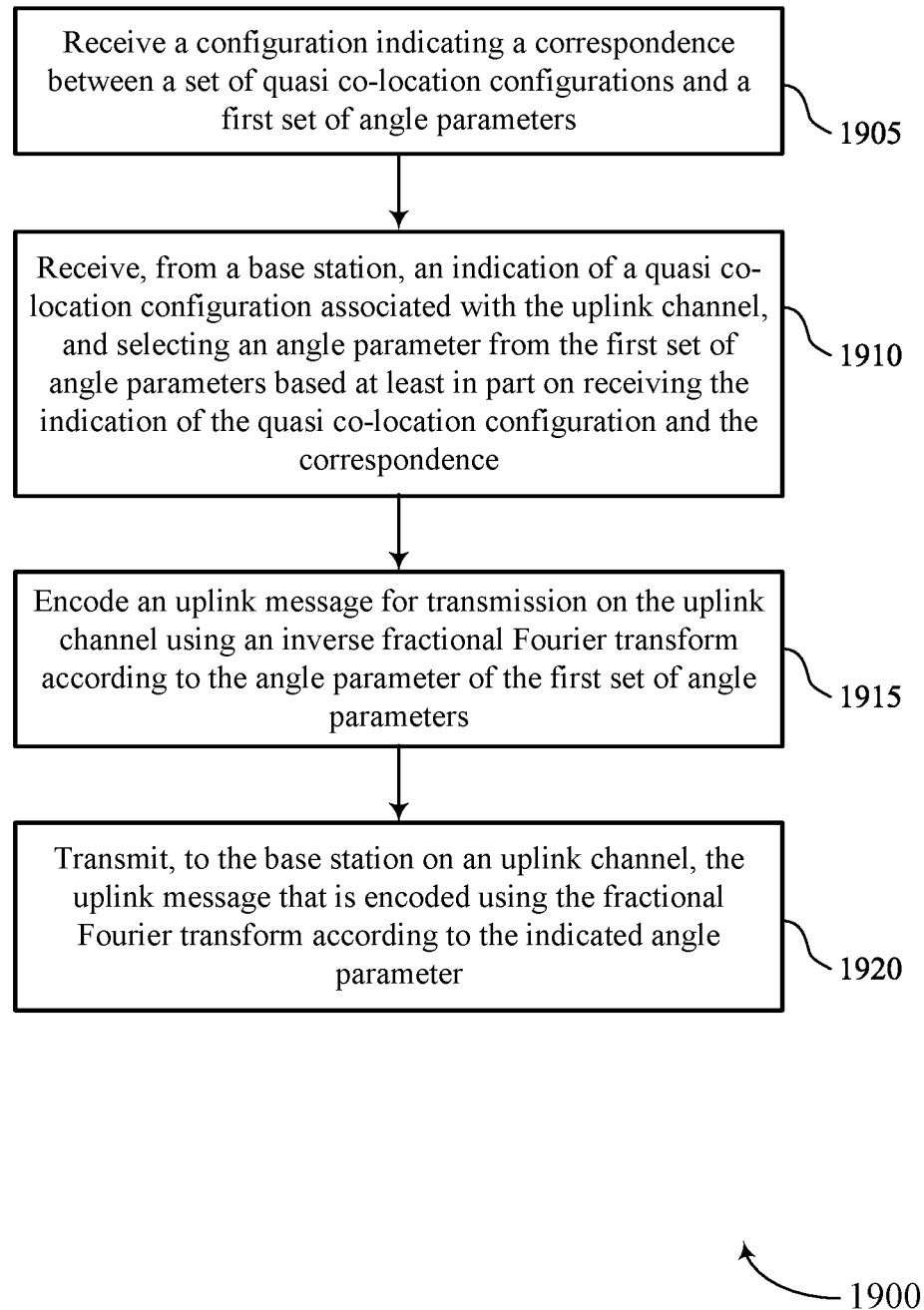

FIG. 19 shows a flowchart illustrating a method 1900 that supports generalization of encoding for uplink transmissions in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a configuration indicating a correspondence between a set of quasi co-location configurations and a first set of angle parameters. The operations of 1905 may be performed in accordance with examples as disclosed herein. In some examples, aspects of the operations of 1905 may be performed by a QCL manager 1050 as described with reference to FIG. 10.

At 1910, the method may include receiving, from the base station, an indication of a quasi co-location configuration associated with the uplink channel, and selecting an angle parameter from the first set of angle parameters based at least in part on receiving the indication of the quasi co-location configuration and the correspondence. The operations of 1910 may be performed in accordance with examples as disclosed herein. In some examples, aspects of the operations of 1910 may be performed by an angle parameter manager 1025 as described with reference to FIG. 10.

At 1915, the method may include encoding an uplink message for transmission on the uplink channel using an inverse fractional Fourier transform according to the angle parameter of the first set of angle parameters. The operations of 1915 may be performed in accordance with examples as disclosed herein. In some examples, aspects of the operations of 1915 may be performed by an encoding manager 1030 as described with reference to FIG. 10.

At 1920, the method may include transmitting, to the base station on an uplink channel, the uplink message that is encoded using the fractional Fourier transform according to the indicated angle parameter. The operations of 1920 may be performed in accordance with examples as disclosed herein. In some examples, aspects of the operations of 1920 may be performed by a fractional Fourier Transform manager 1035 as described with reference to FIG. 10.

Figure 20:
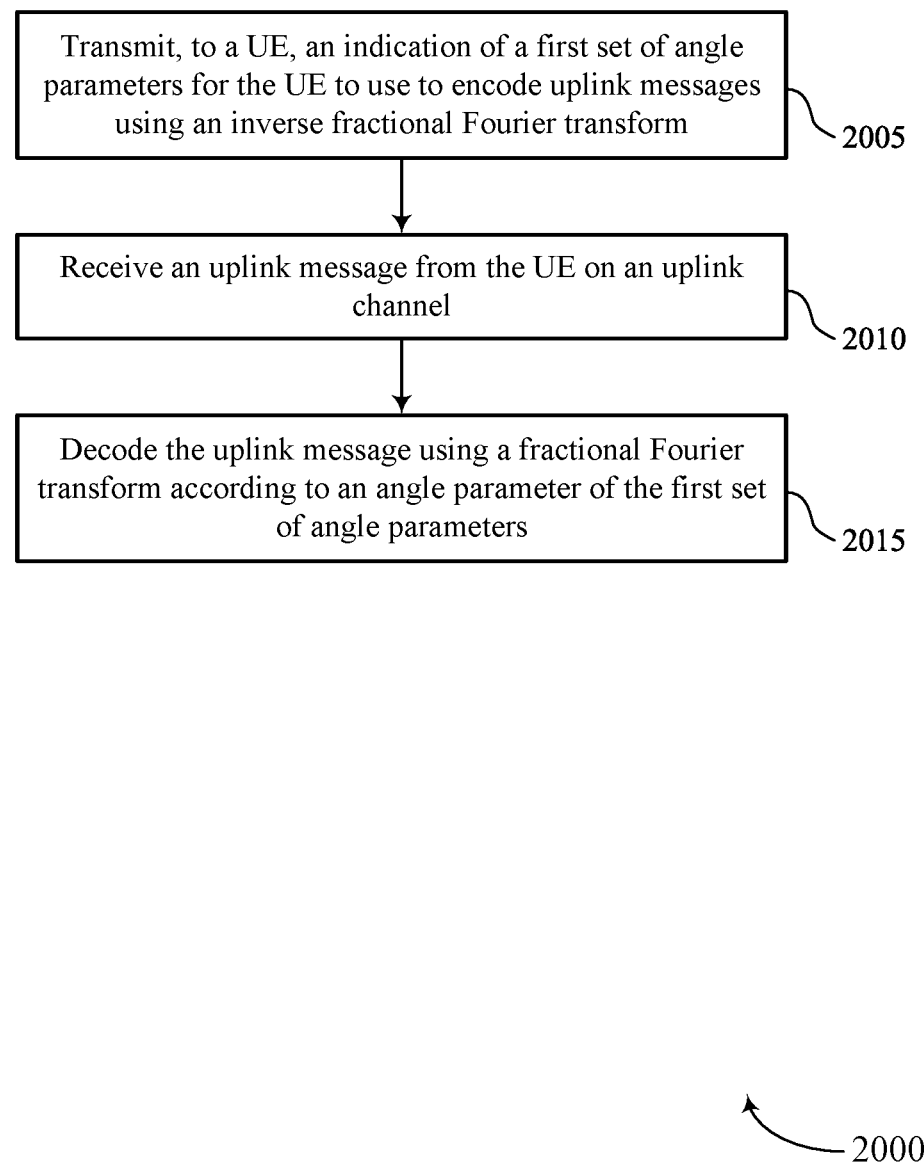

FIG. 20 shows a flowchart illustrating a method 2000 that supports generalization of encoding for uplink transmissions in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2005, the method may include transmitting, to a UE, an indication of a first set of angle parameters for the UE to use to encode uplink messages using an inverse fractional Fourier transform. The operations of 2005 may be performed in accordance with examples as disclosed herein. In some examples, aspects of the operations of 2005 may be performed by an angle parameter manager 1425 as described with reference to FIG. 14.

At 2010, the method may include receiving an uplink message from the UE on an uplink channel. The operations of 2010 may be performed in accordance with examples as disclosed herein. In some examples, aspects of the operations of 2010 may be performed by an uplink signaling manager 1430 as described with reference to FIG. 14.

At 2015, the method may include decoding the uplink message using a fractional Fourier transform according to an angle parameter of the first set of angle parameters. The operations of 2015 may be performed in accordance with examples as disclosed herein. In some examples, aspects of the operations of 2015 may be performed by a decoding manager 1435 as described with reference to FIG. 14.

The following provides an overview of aspects of the present disclosure:

Aspect 1: A method for wireless communications at a UE, comprising: receiving, from a base station, an indication of a first set of angle parameters for the UE to use for an inverse fractional Fourier transform; encoding an uplink message using the inverse fractional Fourier transform according to an angle parameter of the first set of angle parameters; and transmitting, to the base station on an uplink channel, the uplink message that is encoded using the fractional Fourier transform according to the indicated angle parameter.

Aspect 2: The method of aspect 1, further comprising: receiving, from the base station, an indication of the angle parameter of the first set of angle parameters for the UE to use for the inverse fractional Fourier transform.

Aspect 3: The method of any of aspects 1 through 2, further comprising: selecting, by the UE, a second set of angle parameters comprising the angle parameter; and transmitting, to the base station, an indication of the selected second set of angle parameters, wherein receiving the indication of the first set of angle parameters is responsive at least in part to the first set of angle parameters.

Aspect 4: The method of any of aspects 1 through 3, further comprising: transmitting, to the base station, an indication of a second set of angle parameters comprising the angle parameter, wherein the indication of the first set of angle parameters is received at least in part in response to the transmitted indication of the second set of angle parameters; selecting, from the first set of angle parameters, a plurality of angle parameters comprising the angle parameter; transmitting, to the base station, an indication of the selection; and receiving an indication of the angle parameter at least in part in response to the transmitted indication of the selection.

Aspect 5: The method of any of aspects 1 through 4, wherein receiving the indication of the first set of angle parameters comprises: receiving a configuration indicating a correspondence between a set of beam configurations and the first set of angle parameters.

Aspect 6: The method of aspect 5, further comprising: receiving, from the base station, an indication of a beam configuration associated with the uplink message; and selecting the angle parameter from the first set of angle parameters based at least in part on receiving the indication of the beam configuration and the correspondence, wherein encoding the uplink message is based at least in part on the selecting.

Aspect 7: The method of any of aspects 1 through 6, wherein receiving the indication of the first set of angle parameters comprises: receiving a configuration indicating a correspondence between a set of quasi co-location configurations and the first set of angle parameters.

Aspect 8: The method of aspect 7, further comprising: receiving, from the base station, an indication of a quasi co-location configuration associated with the uplink channel; and selecting the angle parameter from the first set of angle parameters based at least in part on receiving the indication of the quasi co-location configuration and the correspondence, wherein encoding the uplink message is based at least in part on the selecting.

Aspect 9: The method of any of aspects 1 through 8, wherein receiving the indication of the first set of angle parameters comprises: receiving a configuration indicating a correspondence between a set of channel conditions and the first set of angle parameters.

Aspect 10: The method of aspect 9, further comprising: determining channel state conditions at the UE; and selecting the angle parameter from the first set of angle parameters based at least in part on determining the channel state conditions and the correspondence, wherein encoding the uplink message is based at least in part on the selecting.

Aspect 11: The method of any of aspects 1 through 10, further comprising: transmitting, to the base station, an indication of a Doppler estimate, wherein the indication of the first set of angle parameters is received at least in part in response to the transmitted indication of the Doppler estimate.

Aspect 12: The method of any of aspects 1 through 11, further comprising: receiving an index value corresponding to the angle parameter, wherein receiving the indication of the first set of angle parameters comprises receiving a list of angle parameters, each angle parameter corresponding to one index of the list.

Aspect 13: The method of any of aspects 1 through 12, wherein receiving the indication of the first set of angle parameters comprises: receiving a radio resource control message, a MAC control element (CE), a downlink control information message, or any combination thereof, comprising the indication of the first set of angle parameters.

Aspect 14: The method of any of aspects 1 through 13, wherein encoding the uplink message comprises: converting a set of information bits associated with the uplink message to a decimal value based at least in part on the angle parameter; selecting a sequence from a pool of sequences based at least in part on the decimal value and the angle parameter; and mapping the selected sequence to one or more resource elements on the uplink channel.

Aspect 15: The method of any of aspects 1 through 14, wherein the uplink message on the uplink channel comprises an uplink control information message on an uplink control channel.

Aspect 16: The method of any of aspects 1 through 15, wherein the transmitted uplink message lacks an associated demodulation reference signal.

Aspect 17: A method for wireless communications at a base station, comprising: transmitting, to a UE, an indication of a first set of angle parameters for the UE to use to encode uplink messages using an inverse fractional Fourier transform; receiving an uplink message from the UE on an uplink channel; and decoding the uplink message using a fractional Fourier transform according to an angle parameter of the first set of angle parameters.

Aspect 18: The method of aspect 17, further comprising: receiving, from the UE, an indication of a second set of angle parameters comprising the angle parameter; and selecting the first set of angle parameters based at least in part on the first set of angle parameters from the UE.

Aspect 19: The method of any of aspects 17 through 18, wherein transmitting the indication of the first set of angle parameters comprises: transmitting a configuration indicating a correspondence between a set of beam configurations and the first set of angle parameters.

Aspect 20: The method of any of aspects 17 through 19, wherein transmitting the indication of the first set of angle parameters comprises: transmitting a configuration indicating a correspondence between a set of quasi co-location configurations and the first set of angle parameters.

Aspect 21: The method of any of aspects 17 through 20, wherein transmitting the indication of the first set of angle parameters comprises: transmitting a configuration indicating a correspondence between a set of channel conditions and individual ones of a set of angle parameters.

Aspect 22: The method of any of aspects 17 through 21, further comprising: receiving, from the UE, an indication of a Doppler estimate, wherein the indication of the first set of angle parameters is transmitted based at least in part on receiving the indication of the Doppler estimate.

Aspect 23: An apparatus for wireless communications at a UE, comprising a processor; memory coupled with the processor; and instructions stored in the memory and executable by the processor to cause the apparatus to perform a method of any of aspects 1 through 16.

Aspect 24: An apparatus for wireless communications at a UE, comprising at least one means for performing a method of any of aspects 1 through 16.

Aspect 25: A non-transitory computer-readable medium storing code for wireless communications at a UE, the code comprising instructions executable by a processor to perform a method of any of aspects 1 through 16.

Aspect 26: An apparatus for wireless communications at a base station, comprising a processor; memory coupled with the processor; and instructions stored in the memory and executable by the processor to cause the apparatus to perform a method of any of aspects 17 through 22.

Aspect 27: An apparatus for wireless communications at a base station, comprising at least one means for performing a method of any of aspects 17 through 22.

Aspect 28: A non-transitory computer-readable medium storing code for wireless communications at a base station, the code comprising instructions executable by a processor to perform a method of any of aspects 17 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, an indication of a first set of angle parameters for the UE to use for an inverse fractional Fourier transform;
   encoding an uplink message using the inverse fractional Fourier transform according to an angle parameter of the first set of angle parameters; and
   transmitting, to the base station on an uplink channel, the uplink message that is encoded using the fractional Fourier transform according to the indicated angle parameter.

2. The method of claim 1, further comprising:
   receiving, from the base station, an indication of the angle parameter of the first set of angle parameters for the UE to use for the inverse fractional Fourier transform.

3. The method of claim 1, further comprising:
   selecting, by the UE, a second set of angle parameters comprising the angle parameter; and
   transmitting, to the base station, an indication of the selected second set of angle parameters, wherein receiving the indication of the first set of angle parameters is responsive at least in part to the first set of angle parameters.

4. The method of claim 1, further comprising:
   transmitting, to the base station, an indication of a second set of angle parameters comprising the angle parameter, wherein the indication of the first set of angle parameters is received at least in part in response to the transmitted indication of the second set of angle parameters;
   selecting, from the first set of angle parameters, a plurality of angle parameters comprising the angle parameter;
   transmitting, to the base station, an indication of the selection; and
   receiving an indication of the angle parameter at least in part in response to the transmitted indication of the selection.

5. The method of claim 1, wherein receiving the indication of the first set of angle parameters comprises:
   receiving a configuration indicating a correspondence between a set of beam configurations and the first set of angle parameters.

6. The method of claim 5, further comprising:
   receiving, from the base station, an indication of a beam configuration associated with the uplink message; and
   selecting the angle parameter from the first set of angle parameters based at least in part on receiving the indication of the beam configuration and the correspondence, wherein encoding the uplink message is based at least in part on the selecting.

7. The method of claim 1, wherein receiving the indication of the first set of angle parameters comprises:

receiving a configuration indicating a correspondence between a set of quasi co-location configurations and the first set of angle parameters.

8. The method of claim 7, further comprising:
receiving, from the base station, an indication of a quasi co-location configuration associated with the uplink channel; and
selecting the angle parameter from the first set of angle parameters based at least in part on receiving the indication of the quasi co-location configuration and the correspondence, wherein encoding the uplink message is based at least in part on the selecting.

9. The method of claim 1, wherein receiving the indication of the first set of angle parameters comprises:
receiving a configuration indicating a correspondence between a set of channel conditions and the first set of angle parameters.

10. The method of claim 9, further comprising:
determining channel state conditions at the UE; and
selecting the angle parameter from the first set of angle parameters based at least in part on determining the channel state conditions and the correspondence, wherein encoding the uplink message is based at least in part on the selecting.

11. The method of claim 1, further comprising:
transmitting, to the base station, an indication of a Doppler estimate, wherein the indication of the first set of angle parameters is received at least in part in response to the transmitted indication of the Doppler estimate.

12. The method of claim 1, further comprising:
receiving an index value corresponding to the angle parameter, wherein receiving the indication of the first set of angle parameters comprises receiving a list of angle parameters, each angle parameter corresponding to one index of the list.

13. The method of claim 1, wherein receiving the indication of the first set of angle parameters comprises:
receiving a radio resource control message, a media access control (MAC) control element (CE), a downlink control information message, or any combination thereof, comprising the indication of the first set of angle parameters.

14. The method of claim 1, wherein encoding the uplink message comprises:
converting a set of information bits associated with the uplink message to a decimal value based at least in part on the angle parameter;
selecting a sequence from a pool of sequences based at least in part on the decimal value and the angle parameter; and
mapping the selected sequence to one or more resource elements on the uplink channel.

15. The method of claim 1, wherein the uplink message on the uplink channel comprises an uplink control information message on an uplink control channel.

16. The method of claim 1, wherein the transmitted uplink message lacks an associated demodulation reference signal.

17. A method for wireless communications at a base station, comprising:
transmitting, to a user equipment (UE), an indication of a first set of angle parameters for the UE to use to encode uplink messages using an inverse fractional Fourier transform;
receiving an uplink message from the UE on an uplink channel; and decoding the uplink message using a fractional Fourier transform according to an angle parameter of the first set of angle parameters.

18. The method of claim 17, further comprising:
receiving, from the UE, an indication of a second set of angle parameters comprising the angle parameter; and
selecting the first set of angle parameters based at least in part on the first set of angle parameters from the UE.

19. The method of claim 17, wherein transmitting the indication of the first set of angle parameters comprises:
transmitting a configuration indicating a correspondence between a set of beam configurations and the first set of angle parameters.

20. The method of claim 17, wherein transmitting the indication of the first set of angle parameters comprises:
transmitting a configuration indicating a correspondence between a set of quasi co-location configurations and the first set of angle parameters.

21. The method of claim 17, wherein transmitting the indication of the first set of angle parameters comprises:
transmitting a configuration indicating a correspondence between a set of channel conditions and individual ones of a set of angle parameters.

22. The method of claim 17, further comprising:
receiving, from the UE, an indication of a Doppler estimate, wherein the indication of the first set of angle parameters is transmitted based at least in part on receiving the indication of the Doppler estimate.

23. An apparatus for wireless communications at a user equipment (UE), comprising:
a processor;
memory coupled with the processor; and
instructions stored in the memory and executable by the processor to cause the apparatus to:
receive, from a base station, an indication of a first set of angle parameters for the UE to use for an inverse fractional Fourier transform;
encode an uplink message using the inverse fractional Fourier transform according to an angle parameter of the first set of angle parameters; and
transmit, to the base station on an uplink channel, the uplink message that is encoded using the fractional Fourier transform according to the indicated angle parameter.

24. The apparatus of claim 23, wherein the instructions are further executable by the processor to cause the apparatus to:
receive, from the base station, an indication of the angle parameter of the first set of angle parameters for the UE to use for the inverse fractional Fourier transform.

25. The apparatus of claim 23, wherein the instructions are further executable by the processor to cause the apparatus to:
selecting, by the UE, a second set of angle parameters comprise the angle parameter; and
transmit, to the base station, an indication of the selected second set of angle parameters, wherein receiving the indication of the first set of angle parameters is responsive at least in part to the first set of angle parameters.

26. The apparatus of claim 23, wherein the instructions are further executable by the processor to cause the apparatus to:
transmit, to the base station, an indication of a second set of angle parameters comprising the angle parameter, wherein the indication of the first set of angle parameters is received at least in part in response to the transmitted indication of the second set of angle parameters;

select, from the first set of angle parameters, a plurality of angle parameters comprising the angle parameter;

transmit, to the base station, an indication of the selection; and receive an indication of the angle parameter at least in part in response to the transmitted indication of the selection.

27. The apparatus of claim 23, wherein the instructions to receive the indication of the first set of angle parameters are executable by the processor to cause the apparatus to:

receive a configuration indicating a correspondence between a set of beam configurations and the first set of angle parameters.

28. The apparatus of claim 23, wherein the instructions to receive the indication of the first set of angle parameters are executable by the processor to cause the apparatus to:

receive a configuration indicating a correspondence between a set of quasi co-location configurations and the first set of angle parameters.

29. The apparatus of claim 23, wherein the instructions to receive the indication of the first set of angle parameters are executable by the processor to cause the apparatus to:

receive a configuration indicating a correspondence between a set of channel conditions and the first set of angle parameters.

30. An apparatus for wireless communications at a base station, comprising:

a processor;

memory coupled with the processor; and instructions stored in the memory and executable by the processor to cause the apparatus to:

transmit, to a user equipment (UE), an indication of a first set of angle parameters for the UE to use to encode uplink messages using an inverse fractional Fourier transform;

receive an uplink message from the UE on an uplink channel; and decode the uplink message using a fractional Fourier transform according to an angle parameter of the first set of angle parameters.

* * * * *